United States Patent [19]
Yamauchi

[11] Patent Number: 5,700,001
[45] Date of Patent: Dec. 23, 1997

[54] METHOD OF RESIN SEALING AN OBJECT WITH APPARATUS INCLUDING A GAS SPRING

[75] Inventor: Shunji Yamauchi, Fukuoka, Japan

[73] Assignee: Mitsubishi Denki Kabushiki Kaisha, Tokyo, Japan

[21] Appl. No.: 407,440

[22] Filed: Mar. 20, 1995

Related U.S. Application Data

[62] Division of Ser. No. 16,371, Feb. 11, 1993, Pat. No. 5,413,471.

[30] Foreign Application Priority Data

May 12, 1992 [JP] Japan .................. 4-118731

[51] Int. Cl.⁶ .................................................. F16F 7/00
[52] U.S. Cl. .................... 267/224; 267/64.25; 267/64.28
[58] Field of Search ................ 267/64.25, 64.28, 267/119, 222, 225

[56] References Cited

U.S. PATENT DOCUMENTS

| | | | |
|---|---|---|---|
| 2,128,626 | 8/1938 | Visser | 267/224 |
| 2,977,146 | 3/1961 | Edwards et al. | 267/64.25 |
| 3,328,019 | 6/1967 | Wilson | 267/64.25 |
| 3,391,425 | 7/1968 | Gardner | |
| 4,702,463 | 10/1987 | Krautkramer | |
| 4,720,367 | 1/1988 | Shenk | |
| 4,723,899 | 2/1988 | Osada | |
| 4,927,347 | 5/1990 | Golata et al. | |
| 5,007,817 | 4/1991 | Wallis | |
| 5,158,780 | 10/1992 | Schraven et al. | |
| 5,172,892 | 12/1992 | Wallis | 267/64.28 |

FOREIGN PATENT DOCUMENTS

| | | |
|---|---|---|
| 61-177218 | 8/1986 | Japan |
| 2-50813 | 2/1990 | Japan |
| 2-92499 | 4/1990 | Japan |
| 3-79825 | 4/1991 | Japan |
| 4-14419 | 1/1992 | Japan |

*Primary Examiner*—Matthew C. Graham
*Attorney, Agent, or Firm*—Lowe, Price, LeBlanc & Becker

[57] ABSTRACT

A gas spring (602) is used as a buffer device in a resin sealing apparatus for applying a compressive force to a plunger (15). In the gas spring (602), the compressive force at which a compression displacement starts is easily established as required, and the increasing degree of the compressive force with increasing compression displacement is established slowly without difficulty. Any errors in applying resin injection pressures to a plurality of plungers, due to variations in the amount of resin of tablets and in length of plungers, are absorbed in a wide range of the compression displacements thereof so that the resin injection pressures in practice are substantially equalized.

7 Claims, 18 Drawing Sheets

METHOD OF RESIN SEALING AN OBJECT WITH APPARATUS INCLUDING A GAS SPRING

This application is a division of U.S. patent application Ser. No. 08/016,371 filed Feb. 11, 1993, now U.S. Pat. No. 5,413,471.

BACKGROUND OF THE INVENTION

1. Field of the Invention

The present invention relates to resin-sealing of small objects such as semiconductor devices, and more particularly for sealing with resin in a predetermined configuration by feeding the resin under pressure into a metal mold cavity having a predetermined inner wall configuration.

2. Description of the Background Art

FIG. 16 is a front sectional view of a resin-sealing apparatus for a semiconductor device as an example of conventional resin-sealing apparatuses. The resin-sealing apparatus of FIG. 16 is a multi-plunger type resin-sealing apparatus fabricated by TOWA CORPORATION.

Semiconductor elements 2 are placed on platelike leadframes 1 and are supported in midair in cavities 5 provided in upper and lower metal molds 3 and 4. The cavities 5 are a space in which the leadframes 1 and semiconductor elements 2 are sealed by molding by injection of molten resin thereinto under pressure and are of a configuration corresponding to the resin configuration required after the molding. The upper metal mold 3 includes gates 6 communicating with the cavities 5 and serving as a path of the molten resin. The lower metal mold 4 includes pots 8 which are apertures for housing therein tablets 7 of resin. The upper metal mold 3 further includes culls 9 which are hollows positioned on the upper surface of the pots 8. The cavities 5 communicate with the pots 8 through the gates 6 and culls 9.

The upper metal mold 3 is fixedly mounted to a fixed upper platen 10, and the lower metal mold 4 is fixedly mounted to a lower metal mold stand 11. The lower metal mold stand 11 is fixedly mounted on a mobile platen 12 vertically movable. Heaters 13, 14 for heating and thermal insulation of the upper and lower metal molds 3, 4 are buried therein, respectively.

Each plunger 15 includes a plunger head 15a and a plunger rod 15b. The plunger heads 15a fitted in the pots 8 feed the tablets 7 to the cavities 5 under pressure. The plunger heads 15a are coupled to respective one end of the plunger rods 15b. The respective other end of the plunger rods 15b is built in a buffer mechanism 16. The buffer mechanism 16 includes string winding springs 16a, a spring case 16b and a nut holder 16c. The string winding springs 16a contact the plunger rods 15b to apply a compressive force thereto. The spring case 16b prevents the plunger rods 15b from slipping off and houses therein the string winding springs 16a to which the compressive force is applied in cooperation with the nut holder 16c.

The nut holder 16c is provided with a female thread to threadingly engage a ball screw shaft 17 provided with a male thread. The ball screw shaft 17 is rotatably supported by a bearing 18 fixed to the mobile platen 12 and acts against a reactive force generated in the ball screw shaft 17 when the tablets 7 are pressurized. The bearing 18 is fixed by bearing stoppers 19 so as not to come out of the mobile platen 12. A driven pulley 20 is fixedly mounted to the ball screw shaft 17 by tightening a nut 21. The ball screw shaft 17 rotates as the driven pulley 20 rotates. A motor 22 produces a running torque of the driven pulley 20. A running torque of the motor 22, after amplified in a speed-reduction gear 23, is transmitted to a driving pulley 24 to be further transmitted to the driven pulley 20 through a belt 25. The motor 22 and the speed-reduction gear 23 are fixedly mounted on the mobile platen 12 through a motor mounting plate 26.

FIG. 17 is a bottom plan view of the upper metal mold 3. One leadframe 1 is provided for eight semiconductor elements 2. The resin-sealing apparatus comprises four culls 9 for each leadframe 1. The culls 9 are in one-to-one corresponding relation to the pots 8 and plungers 15. Thus the resin-sealing apparatus is of the multi-plunger type in which the plurality of plungers 15 are provided for the single leadframe 1 and of a two-cavity/pot type in which two cavities 5 are provided for the single pot.

Operation of Conventional Resin-sealing Apparatus

A conventional resin-sealing method is executed by means of the resin-sealing apparatus in such a manner as described hereinafter. A controlled current is caused to flow in the heaters 13, 14 of FIG. 16 to heat and keep the upper and lower metal molds 3, 4 at a temperature of 180° C. suitable for thermosetting resin. Then as the mobile platen 12 descends to open the upper and lower metal molds 3, 4 from each other, two leadframes 1 on which the semiconductor elements 2 are disposed are placed on the upper surface of the lower metal mold 4 in a predetermined position corresponding to the position of FIG. 17 on the bottom of the upper metal mold 3. Eight solid tablets 7 are put into the respective pots 8. The leadframes 1 as materials to be sealed and the tablets 7 are fed to the predetermined position manually or by means of a loader (not shown).

After feeding the materials to be sealed, the mobile platen 12 ascends, and the upper and lower metal molds 3, 4 are locked and pressurized. At this time, the leadframes 1 and semiconductor elements 2 are positioned as shown in FIG. 17 with respect to the lower surface of the upper metal mold 3. After the tablets 7 are melted by the heat of the lower metal mold 4, the motor 22 is driven to apply rotational motion as well as the running torque to the ball screw shaft 17. As a result, the threading engagement between the ball screw shaft 17 and the nut holder 16c causes the nut holder 16c to be propelled upwardly with a compressive force. The compressive force of the nut holder 16c is transmitted to the string winding springs 16a, plunger rods 15b, plunger heads 15a in this order, whereby the molten resin of the tablets 7 is pressurized. This pressure extrudes the molten resin from the pots 8. The extruded molten resin is introduced through the culls 9, gates 6 into the cavities 5 in which the leadframes 1 and semiconductor elements 2 are supported in midair to fill the space of the cavities 5. The thermosetting resin hardens after a predetermined period of time in a configuration defined by the configuration of the inner walls of the cavities 5 such that it hermetically encloses the leadframes 1 and semiconductor elements 2 supported in midair. That is, the leadframes 1 and semiconductor elements 2 as the materials to be sealed are sealed with resin in the external shape defined by the cavities 5.

On completion of sealing, the mobile platen 12 descends so that the upper and lower metal molds 3, 4 are opened. The sealed leadframes 1 and semiconductor elements 2 and the hardened resin remaining in the gates 6 and culls 9 are removed from the upper surface of the lower metal mold 4. Such operations are carried out manually or by means of the loader (not shown).

Operation of Buffer Mechanism 16

The string winding springs 16a are provided for the purpose of preventing competent differences to be made in pressures when the molten resin is injected into the respective cavities 5, i.e., in injection pressures due to variations in the amount of resin of each tablet 7 and in height of each plunger rod 15b. Establishments with respect to the string winding springs 16a in accordance with the requirements indicated in Expression (1) are carried out so that the string winding springs 16a equalize the injection pressures when the injection pressures are set to a predetermined level p.

$$F1=p \cdot A, \; F0=k \cdot x0, \; F0<F1 \tag{1}$$

where p is the injection pressure (kgf/cm$^2$), F1 is an injection force (kgf), F0 is an initial compressive force (kgf), A is a cross-sectional area of the pot 8 (cm$^2$), k is a spring constant (kgf/mm), x0 is an initial compression displacement of the spring (ram).

The injection force F1 is a compressive force applied to the resin when injected and is equal to a restoring force generated by the string winding springs 16a at this time. The initial compressive force F0 is a compressive force applied to the resin when the tablets 7 start being introduced and is equal to a restoring force generated by the string winding springs 16a at this time. The initial compressive force F0 is equivalent to a restoring force generated by the initial compression displacement x0 applied when the string winding springs 16a are housed in the spring case 16b before the injection of resin. When the injection pressure p is 70 kgf/cm$^2$ as a function of the requirements of Expression (1), the spring constant k and initial compression displacement x0 are selected such that the initial compressive force F0 when converted into a pressure is less than 70 kgf/cm$^2$, for example 60 kgf/cm$^2$.

Relation between the compression displacement of the string winding springs 16a and the accompanying restoring force thereof is shown in the graph of FIG. 18, for example. In this example, the cross-sectional area A of the pot 8 is 2 cm$^2$, the spring constant k of the string winding spring 16a is 20 kgf/mm, the injection pressure p is set to 70 kgf/cm$^2$ (i.e., the injection force F1 is set to 140 kgf), and the initial compressive force F0 is set to 120 kgf which is equivalent to 60 kgf/cm$^2$ if estimated in pressure. For providing the initial compressive force F0, it is necessary to house the string winding springs 16a into the spring case 16b with the initial compression displacement x0 applied thereto. In this example, the initial compression displacement x0 of 6 mm is required. A further compression displacement of 1 mm is applied to the string winding springs 16a by the time the restoring force reaches the predetermined injection force F1 of 170 kgf. If the errors of the displacement of the nut holder 16c required for the injection force F1 to reach the predetermined level 170 kgf are within ±1 mm from the predetermined level, there is generated a difference in compression displacements of the string winding springs 16a whereby the errors of the injection force fall in the range of ±20 kgf from the predetermined level 170 kgf.

Problems of Conventional Resin-sealing Apparatus

The conventional resin-sealing apparatus described above has the following drawbacks:

First, for expansion of the error range of the displacement of the nut holder 16c permitted to be absorbed by the string winding springs 16a, it is desirable to employ the string winding springs 16a having a lower spring constant k to apply a larger initial compression displacement x0 thereto. However, the string winding springs 16a satisfying such requirements are excessively large in volume, not suitable for application to the resin-sealing apparatus, resulting in difficulties in handling such as mount in or dismount from the buffer mechanism 16. In the conventional resin-sealing apparatus in which the string winding springs 16a are used as the buffer mechanism 16, the error range of the displacements absorbed by the buffer mechanism 16 necessarily has a limit which is practically about ±1 mm. Therefore, a drawback of the conventional resin-sealing apparatus is that the errors of the displacement from the predetermine level due to variation in the amount of resin of the tablets 7 and in length of the plungers 15 are not absorbed sufficiently in a wide range.

Another drawback of the conventional resin-sealing apparatus is ease of generation of variation in the spring constant k in the light of manufacturing technique of the string winding springs 16a. This causes errors of the injection pressure p from a predetermined level and further limitation of the error absorbable range of the displacements.

Furthermore, if the tablets 7 of an excessive amount of resin are injected, the string winding springs 16a are subjected to an excessive compression displacement so that plastic deformation is caused, resulting in an excessive errors of the subsequent injection pressure. To prevent such errors, the string winding springs 16a must be exchanged, as is a third drawback of the conventional resin-sealing apparatus. The exchange of the string winding springs 16a requires much labor and interruption of the resin-sealing apparatus during the exchange. This reduces a throughput (the amount of processing operation per unit time).

A fourth drawback of the conventional resin-sealing apparatus is the necessity of exchanging the string winding springs 16a for other springs having a different spring constant k because of the fixed spring constant k of the string winding springs 16a when the set value of the injection pressure p is changed. This also requires much labor and reduces the throughput.

The necessity of application of the initial compressive force with an excessive load of more than 100 kgf during the mount and dismount of the string winding springs 16a is a fifth drawback of the conventional resin-sealing apparatus. This also requires much labor and deteriorates working efficiency.

SUMMARY OF THE INVENTION

The present invention is directed to a method of sealing an objective with a resin.

According to the present invention, the method comprises the steps of: (a) obtaining gas spring means having a gas whose pressure is controllable; (b) pushing said resin to said objective through said gas spring means; and (c) sealing said objective with said resin.

An aspect of the present invention is directed to a resin-sealing method for applying a compressive force to a plunger fitted in a pot to transmit resin fed into the pot to a cavity of a predetermined configuration provided in a mold to perform sealing. According to the present invention, the method comprises the steps of: (a) providing a gas spring using a filling gas as a buffer medium, (b) regulating the pressure of the filling gas so as to be at a predetermined pressure, and (c) applying the compressive force to the plunger through the gas spring to transmit the resin to the cavity under pressure.

The present invention is also directed to a resin-sealing apparatus for applying a compressive force to at least one plunger fitted respectively in at least one pot to transmit resin fed into the pot to a cavity of a predetermined configuration provided in a mold under pressure to perform sealing. According to the present invention, the apparatus comprises: (a) buffer means for applying an elastic restoring force to the plunger, the buffer means including (a-1) at least one gas spring using a filling gas as a buffer medium and substantially abutting respectively against said at least one plunger, (b) means for regulating the pressure of the filling gas so as to be at a predetermined pressure, and (c) means for applying the compressive force to the plunger through the buffer means.

The resin-sealing technique of the present invention wherein the gas spring is used as the buffer means for application of the compressive force to the plunger affords the establishment of the compressive force at which the compression displacement providing the buffer effects to the buffer means starts as required with ease and the establishment of a desirable slow increase of the compressive force with increasing compression displacement with ease. Thus errors of resin injection pressures due to variations in the amount of resin of the tablets and in length of the plungers are absorbed in a wide range to equalize the injection pressures. Furthermore, the set value of the resin injection pressures is easily changed by changing the pressure of the filling gas in the gas spring. The filling gas as the buffer medium is not subjected to permanent distortion, causing neither deterioration of the injection pressures nor increasing errors of the injection pressures in the course of operation. The gas spring has a smaller volume than the conventional springs, providing easy handling of the buffer means.

The present invention is also directed to a gas spring using a filling as a buffer medium. According to the present invention, the gas spring comprises: (a) a substantially cylindrical housing having a first end opened and a second end closed, (b) a substantially cylindrical first piston rod having a first end opened and a second end closed and slidably fitted in the housing such that the second end defines a first space kept hermetic off the outside in cooperation with the housing, (c) a second piston rod slidably fitted in a cylindrical portion of the first piston rod for defining a second space kept hermetic off the outside together with the first piston rod, (d) means for limiting a sliding range of the first piston rod to prevent the first piston rod from projecting out over a predetermined degree from the housing, (e) means for limiting a sliding range of the second piston rod to prevent the second piston rod from projecting out over a predetermined degree from the first piston rod, (f) a first valve mounted in the first piston rod between the second space and the outside, the first valve permitting the filling gas to pass therethrough and having a non-return function against the filling gas directed from the second space to the outside, and (g) a second valve mounted in the housing between the first space and the outside, the second valve permitting the filling gas to pass therethrough and having a non-return function against the filling gas directed from the first space to the outside.

The gas spring of the present invention includes gas springs substantially connected in two-stage cascade with simple structure. The structure substantially connected in two-stage cascade provides two stages of the compressive force increasing characteristics with the increasing compression displacement. In the second stage succeeding the first stage, the compressive force increases more slowly as the compression displacement increases. The application of the gas spring to the resin-sealing technique of the present invention affords, as well as the absorption of the errors of the resin injection pressures by the compressive force in the first stage for equalization of the injection pressures, sufficient reduction of the extremely large injection pressure errors in abnormal injection operation due to the extreme variations in the amount of resin by the compressive force in the second stage. Furthermore, the set value of the resin injection pressures is easily changed, causing neither the deterioration of the injection pressures nor the increasing errors of the injection pressures in the course of operation. Advantageously, the buffer means is easily handled.

In another aspect of the present invention, the gas spring comprises: (a) a housing including a plurality of cylinders each having a first end opened and a second end closed and communicating with each other, the plurality of cylinders being arranged in parallel, (b) a plurality of piston rods each slidably fitted in one of the plurality of cylinders for defining a space kept hermetic off the outside in cooperation with the housing, (c) means for limiting a sliding range of each of the plurality of piston rods to prevent each of the piston rods from projecting out over a predetermined degree from the housing, and (d) a valve mounted in the housing between the spacing and the outside, the valve permitting the filling gas to pass therethrough and having a non-return function against the filling gas directed from the space to the outside.

The gas spring of the present invention substantially includes the plurality of gas springs arranged in parallel. The filling gases as the buffer medium in the respective gas springs communicate with each other, and the pressures of the gases are ensured to be equal to each other constantly. The application of the gas springs to the resin-sealing technique of the present invention wherein the plurality of pots and plungers are provided ensures the same compressive force to be applied to the respective plungers. The errors of the resin injection pressures are absorbed to equalize the injection pressures more effectively. The set value of the resin injection pressures is easily changed, causing neither the deterioration of the injection pressures nor the increasing errors of the injection pressures in the course of operation. Advantageously, the buffer means is easily handled.

A primary object of the present invention is to provide a resin-sealing technique which absorbs errors of a displacement of a nut holder from a predetermined value due to variations in the amount of resin of tablets and in length of plungers in a wide range to equalize resin injection pressures.

Another object of the invention is to provide a resin-sealing technique which provides ease of changes in set value of the injection pressures.

Still another object of the invention is to provide a resin-sealing technique which prevents reduction in the injection pressures and increasing errors of the injection pressures in the course of work.

A further object of the invention is to provide a resin-sealing technique providing ease of handling of an apparatus or preparation process of a method.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Structure of Resin-sealing System 100

Figure 2:
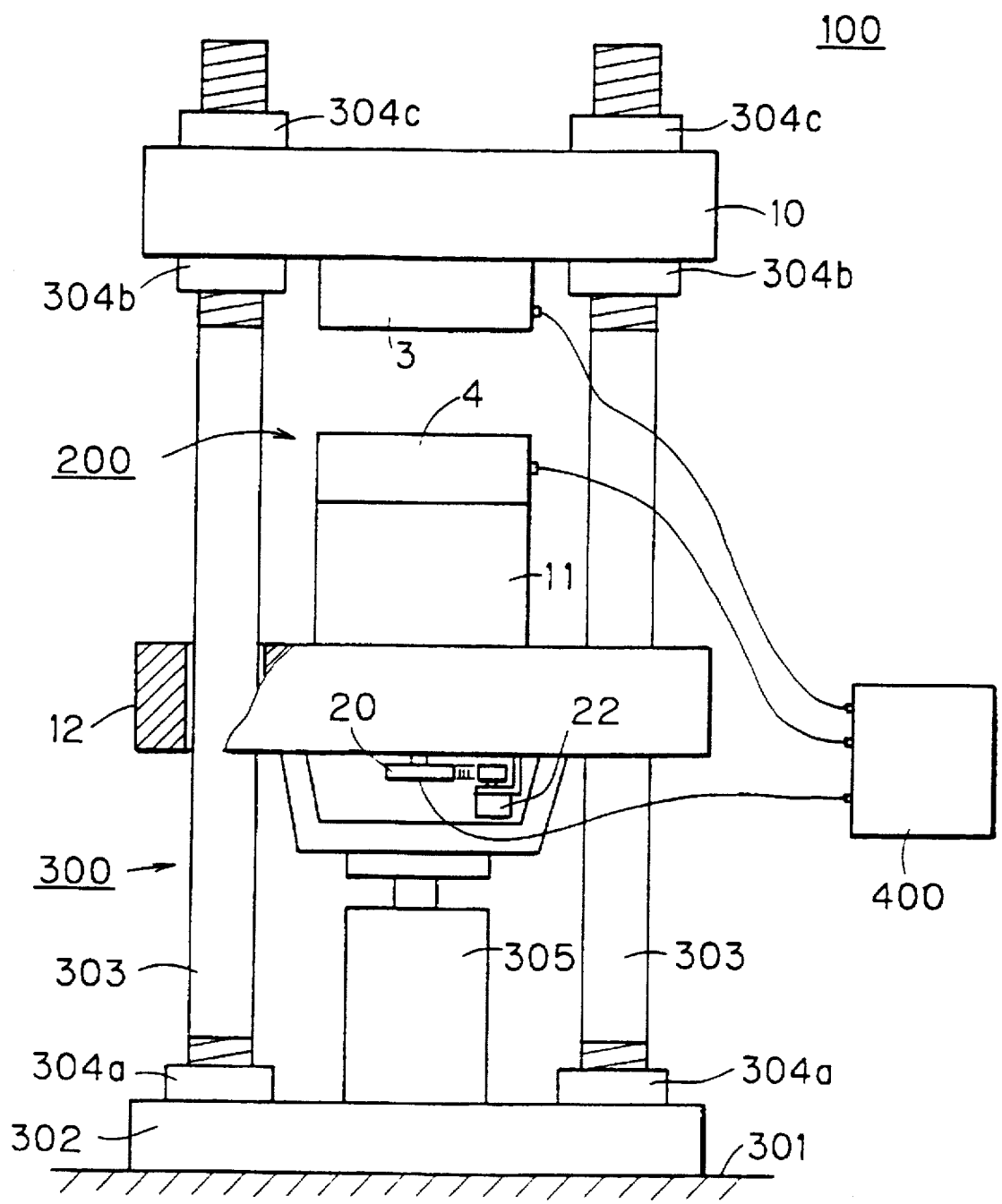
FIG. 2 is a schematic front view of a resin-sealing system of the first preferred embodiment.

FIG. 2 is a schematic view of a resin-sealing system 100 of a first preferred embodiment according to the present invention. The resin-sealing system 100 comprises a resin-sealing apparatus 200, a compressive force application apparatus 300, a temperature controller 40, and a sample feeder 500.

The resin-sealing apparatus 20 is a major part of the resin-sealing system 100 and seals fed materials to be sealed with fed resin.

The compressive force application apparatus 300 opens and closes upper and lower metal molds 3, 4 of the resin-sealing apparatus 200 when the sample such as resin is fed thereto and applies a compressive force thereto to close the upper and lower metal molds 3, 4 under pressure during resin-sealing. The compressive force application apparatus 300 comprises tie bars 303 that are supports mounted on a pedestal 302 placed on a floor 301, an upper platen 10 fixed to the top of the tie bars 303, nuts 304a to 304c for combining these members with each other, a mobile platen 12 slidably supported by the tie bars 303, and a hydraulic cylinder 305 for vertically moving the mobile platen 12.

Figure 3:
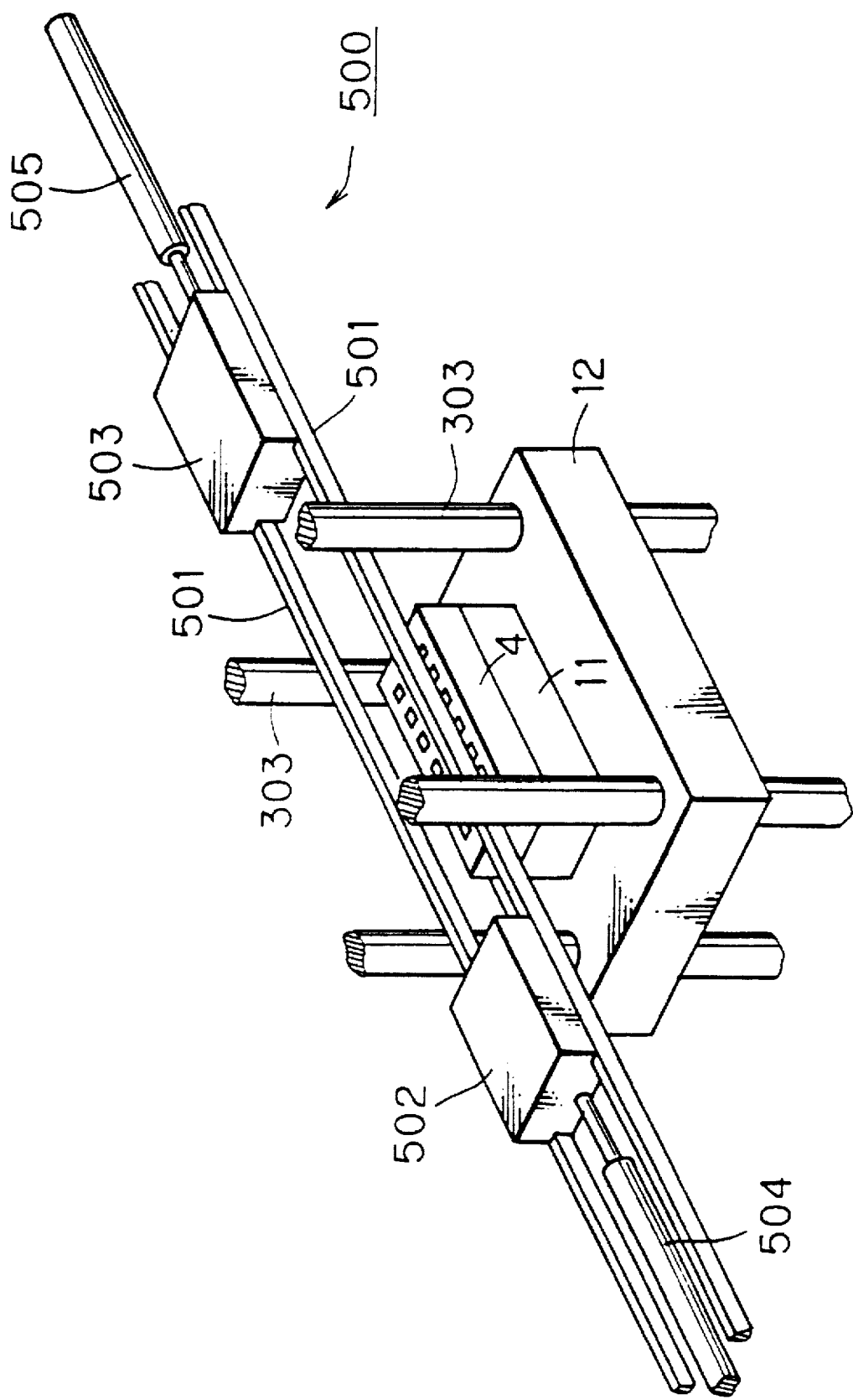
FIG. 3 is a partial schematic perspective view of the resin-sealing system of the first preferred embodiment.

The temperature controller 400 controls the temperatures of respective portions in the resin-sealing apparatus 200. The sample feeder 500 schematically shown in FIG. 3 feeds the materials to be sealed such as semiconductor elements 2 and resin to the resin-sealing apparatus 200 and removes them after sealing. The sample feeder 500 comprises a guide 501 constructed in midair between the upper and mobile platens 10 and 12, and loader 502 and unloader 503 slidably attached to the guide 501. The loader 502 feeds the materials to be sealed such as semiconductor elements 2 and resin to the resin-sealing apparatus 200, and the unloader 503 removes them after sealing. The loader 502 and unloader 503 travel back and forth along the guide 501 by a loader drive apparatus 504 and an unloader drive apparatus 505, respectively.

Figure 4:
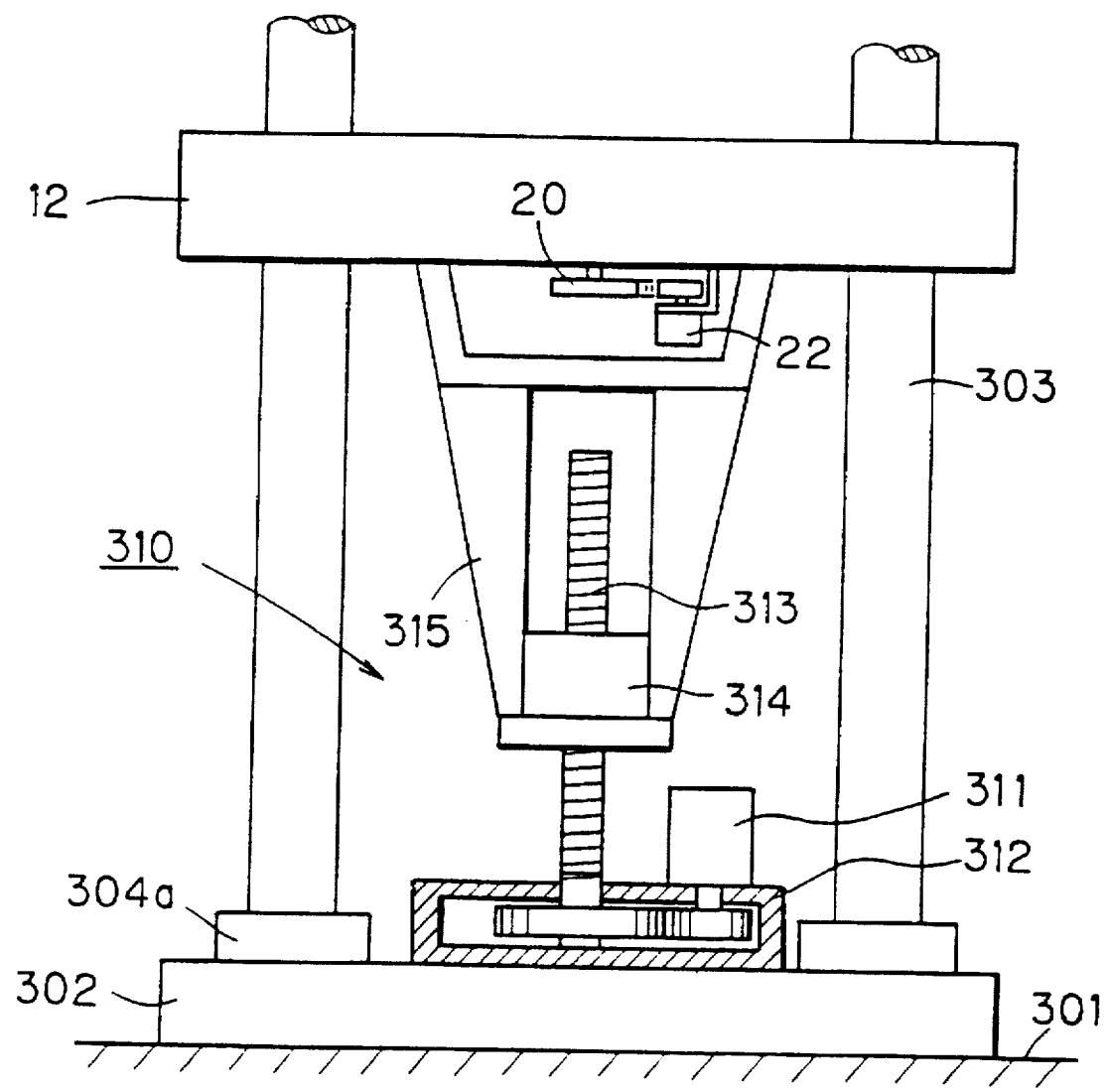
FIG. 4 is a partial schematic front view of the resin-sealing system of the first preferred embodiment.

A drive apparatus 310 shown in FIG. 4 may be used in place of the hydraulic cylinder 305 of FIG. 2. The drive apparatus 310 transmits the rotation of a motor 311 to a screw shaft 313 by means of a gear mechanism 312 to vertically propel a nut 314 threadingly engaging the screw shaft 313 and a nut holder 315 for fixing the nut 314. The nut holder 315 is fixed to the mobile platen 12, and the mobile platen 12 vertically slides along the tie bars 303 as the nut holder 315 moves.

Structure of Resin-sealing Apparatus 200

Figure 1:
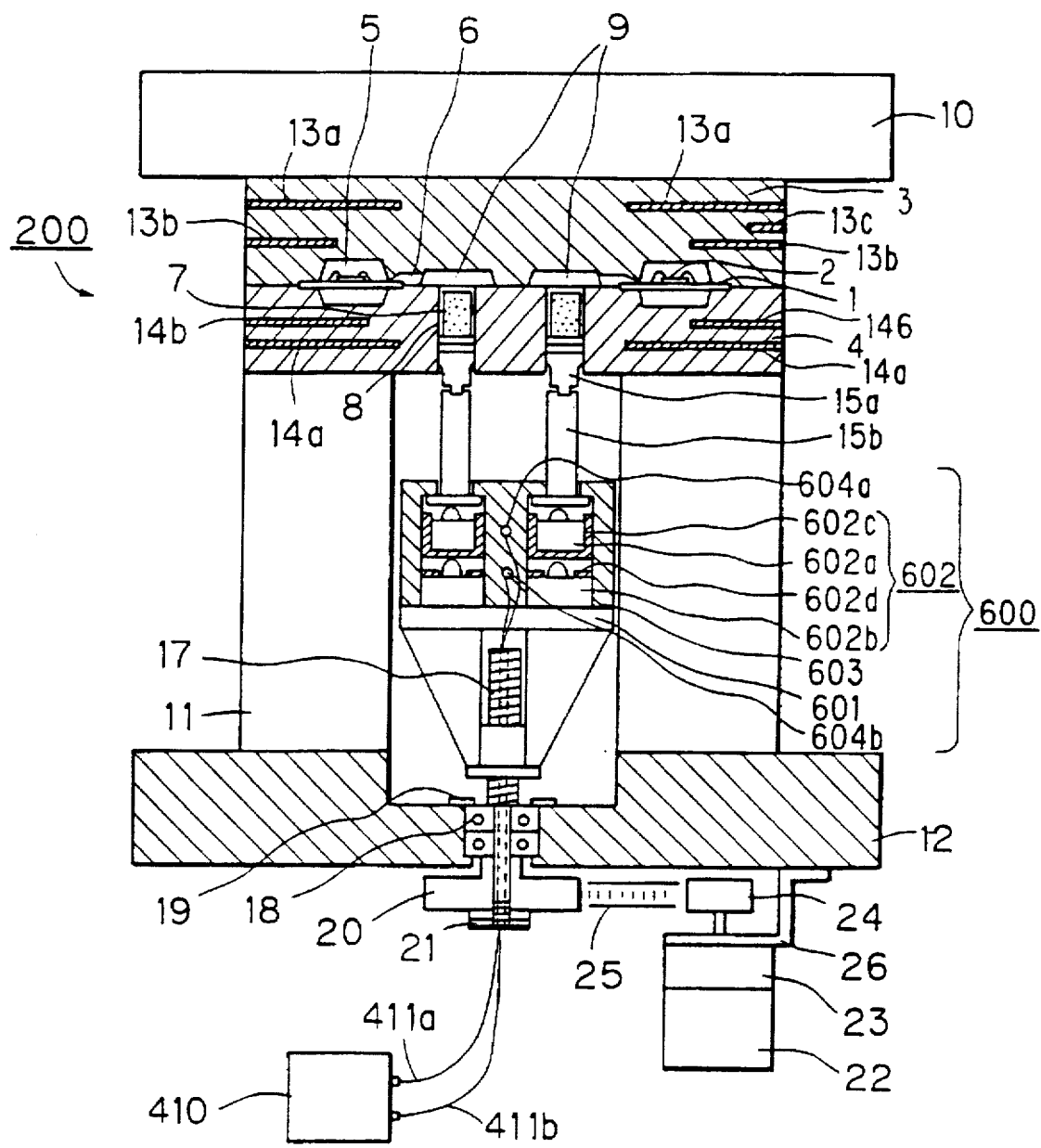
FIG. 1 is a front sectional view of a resin-sealing apparatus for sealing semiconductor elements with resin according to a first preferred embodiment of the present invention.
Figure 16:
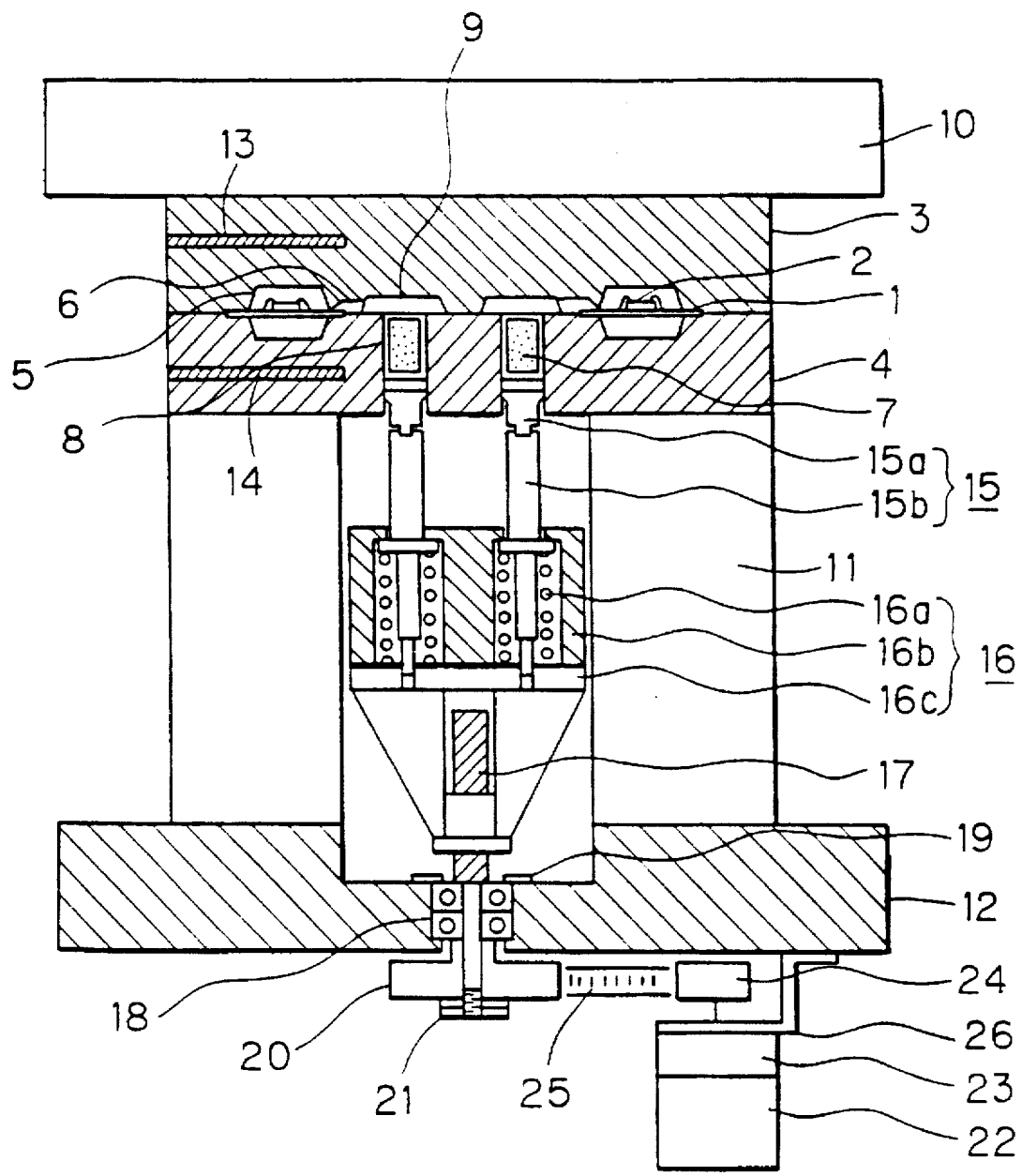
FIG. 16 is a front sectional view of a conventional resin-sealing apparatus taken along the line A–A'.
Figure 17:
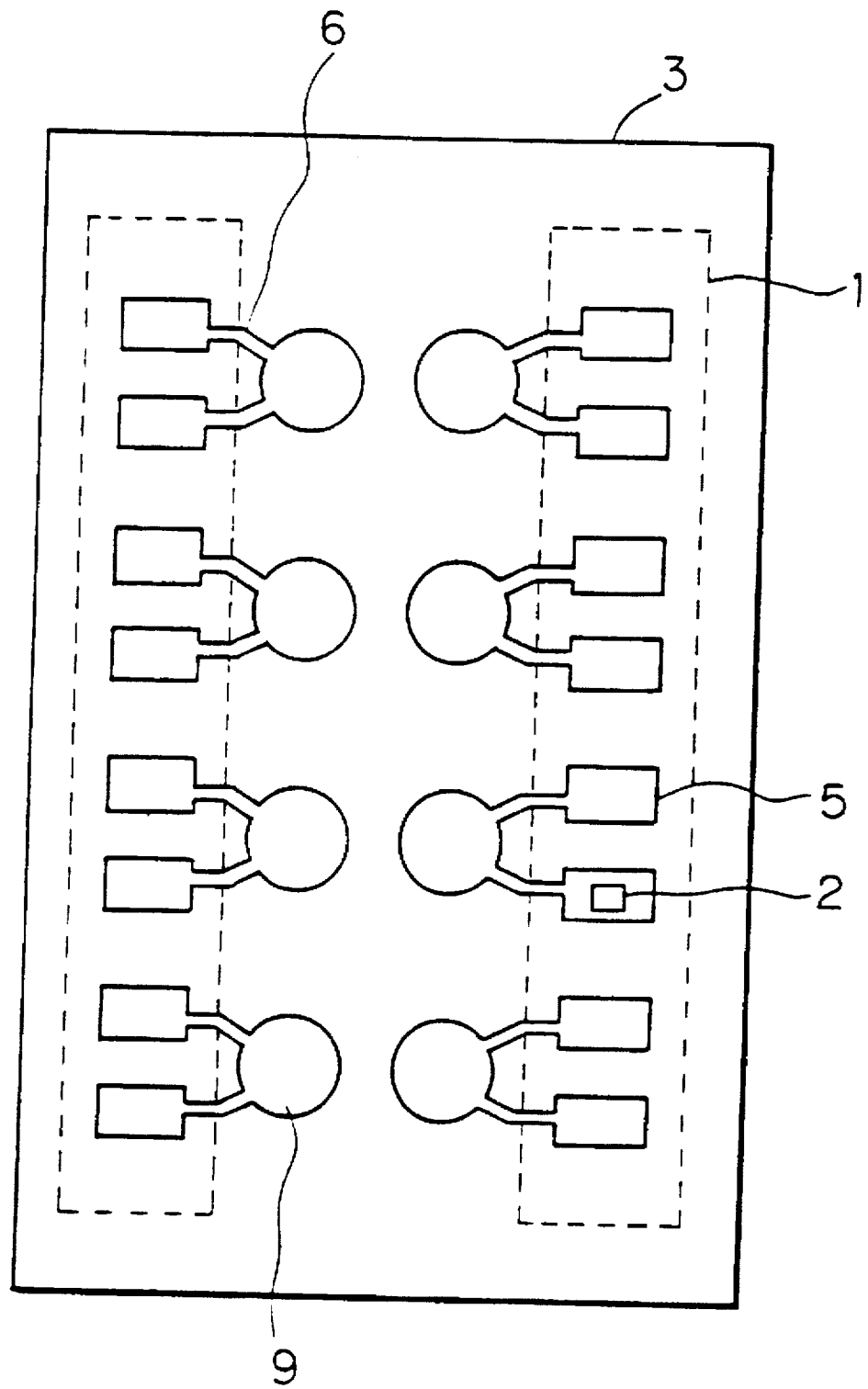
FIG. 17 is a bottom view of an upper metal mold of the conventional resin-sealing apparatus.
Figure 18:
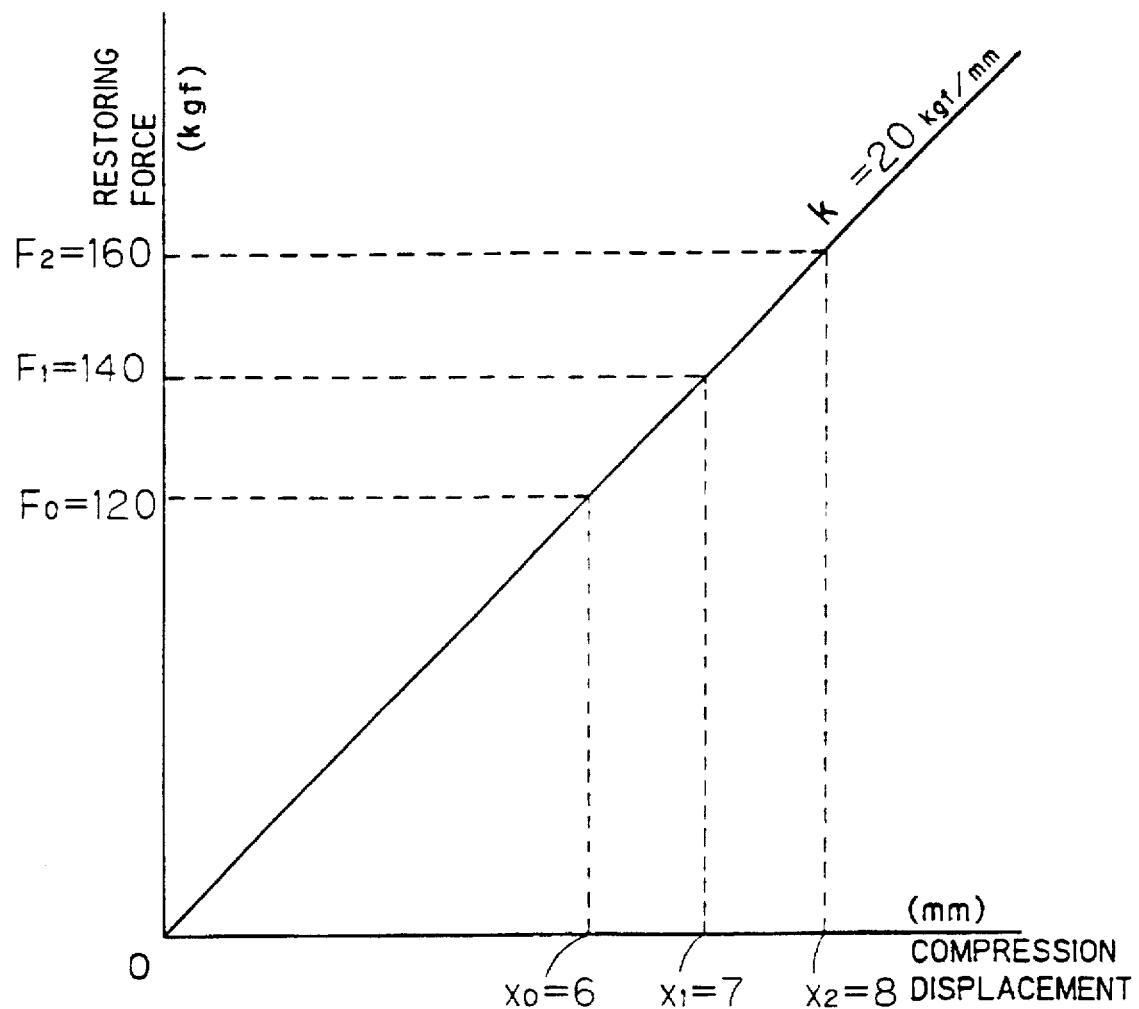
FIG. 18 is a graph showing relation between compression displacement and restoring force of string winding springs of the prior art.

FIG. 1 is a front sectional view of the resin-sealing apparatus 200 for sealing the semiconductor elements 2 with resin according to the first preferred embodiment of the present invention. Like reference numerals and characters are used to designate parts identical with those of the conventional apparatus of FIG. 16. A buffer mechanism (buffer means) 600 are provided between the plungers 15 and the ball screw shaft 17.

The buffer mechanism 600 comprises a nut holder 601 threadingly engaging the ball screw shaft 17, two-stage cascade connected gas springs 602 contacting the bottom surface of the plunger rods 15b to thrust up the plunger rods 15b, and a gas spring case 603 for preventing the plunger rods 15b from slipping off and houses therein the gas springs 602 to which the compressive force is applied in cooperation with the nut holder 601.

Each of the gas springs 602 includes two-stage cascade connected gas spring bodies 602a, 602b, a holder 602c and a collar 602d. The holder 602c holds the gas spring body 602a slidably in the gas spring case 603 and prevents the gas spring body 602a from being compressed over a predetermined degree to transmit a compression displacement to the gas spring body 602b. The collar 602d positioned in the periphery of the head of the gas spring body 602d is a safeguard for preventing the gas spring body 602b from being compressed over a predetermined degree.

In the gas spring case 603 are buried a heater 604a for controlling the pressure of a gas (filling gas) filling the gas spring 602 and a thermocouple 604b for detecting temperatures. A detection signal of the thermocouple 604b is sent to a gas temperature controller 410 that is part of the temperature controller 400 through a wire 411b. The gas temperature controller 410 causes a current controlled as a function of the detection signal to flow through a wire 411a to the heater 604a. Thus the temperature of the gas spring case 603 is held at a predetermined level, whereby the pressure of the filling gas in the gas spring 602 is controlled.

Figure 5:
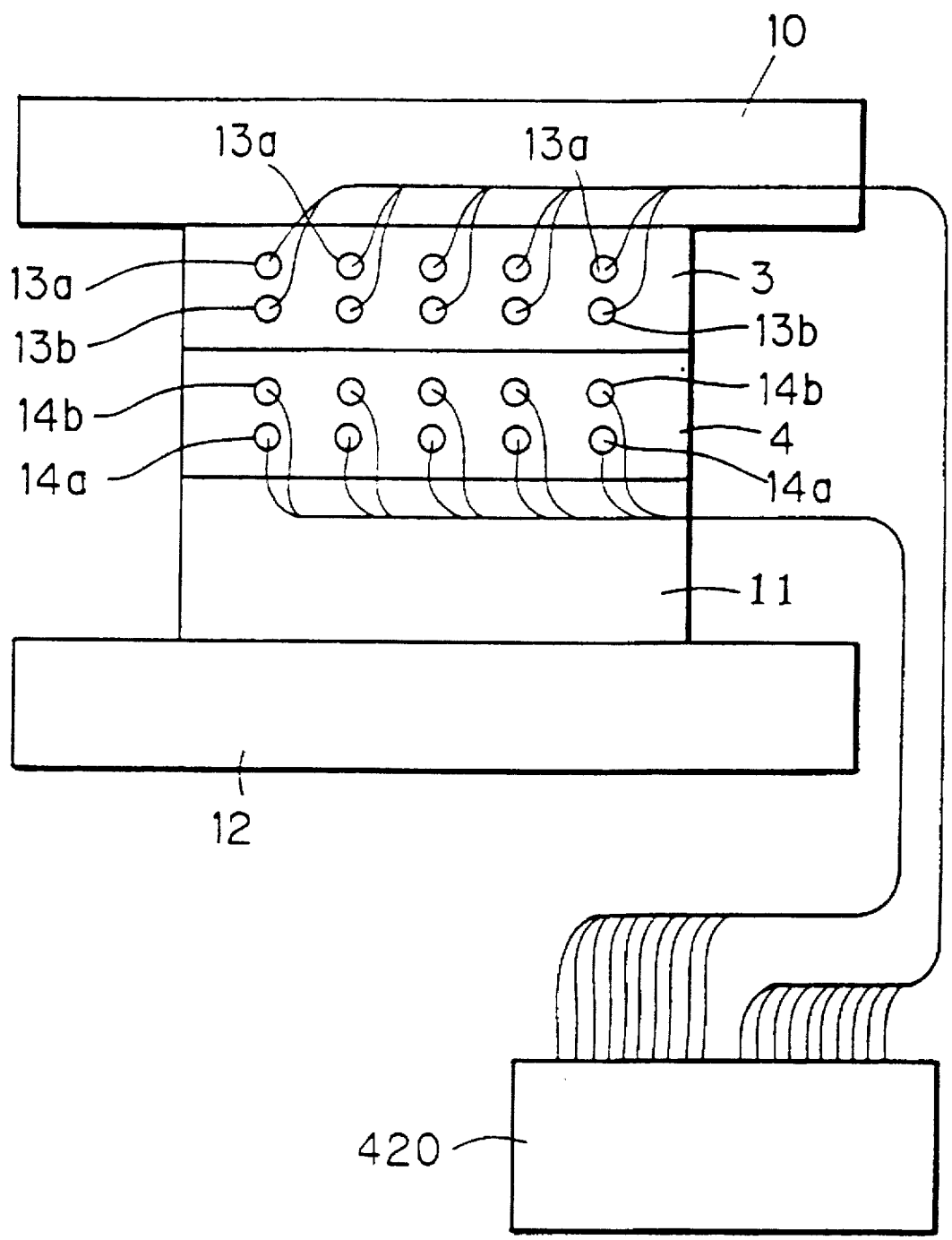
FIG. 5 is a partial schematic side view of the resin-sealing apparatus of the first preferred embodiment.

In the upper and lower metal molds 3, 4 are buried heaters 13a, 14a for heating and thermal insulation thereof, thermocouples 13b, 14b for temperature detection, and sensbeys 13c, 14c serving as a safeguard preventing overheat. They are connected to a metal mold temperature controller 420 through wires as parts of the temperature controller 400. FIG. 5 is a schematic side view of the resin-sealing apparatus 200. As shown in FIG. 5, the heaters 13a, 14a are disposed in plurality in pairs with the thermocouples 13b, 14b, respectively. The metal mold temperature controller 420 causes a controlled current to flow in the heaters 13a, 14a as a function of the temperatures detected by the thermocouples 13b, 14b for each pair to keep the temperatures of the upper and lower metal molds 3, 4 uniformly at a predetermined level. On detection of excessively high temperatures by the sensbeys 13c, 14c, the metal mold temperature controller 420 cuts off the current to protect the materials to be sealed such as the semiconductor elements 2 and the resin.

Structure of Gas Spring Bodies 602a, 602b

Figure 6:
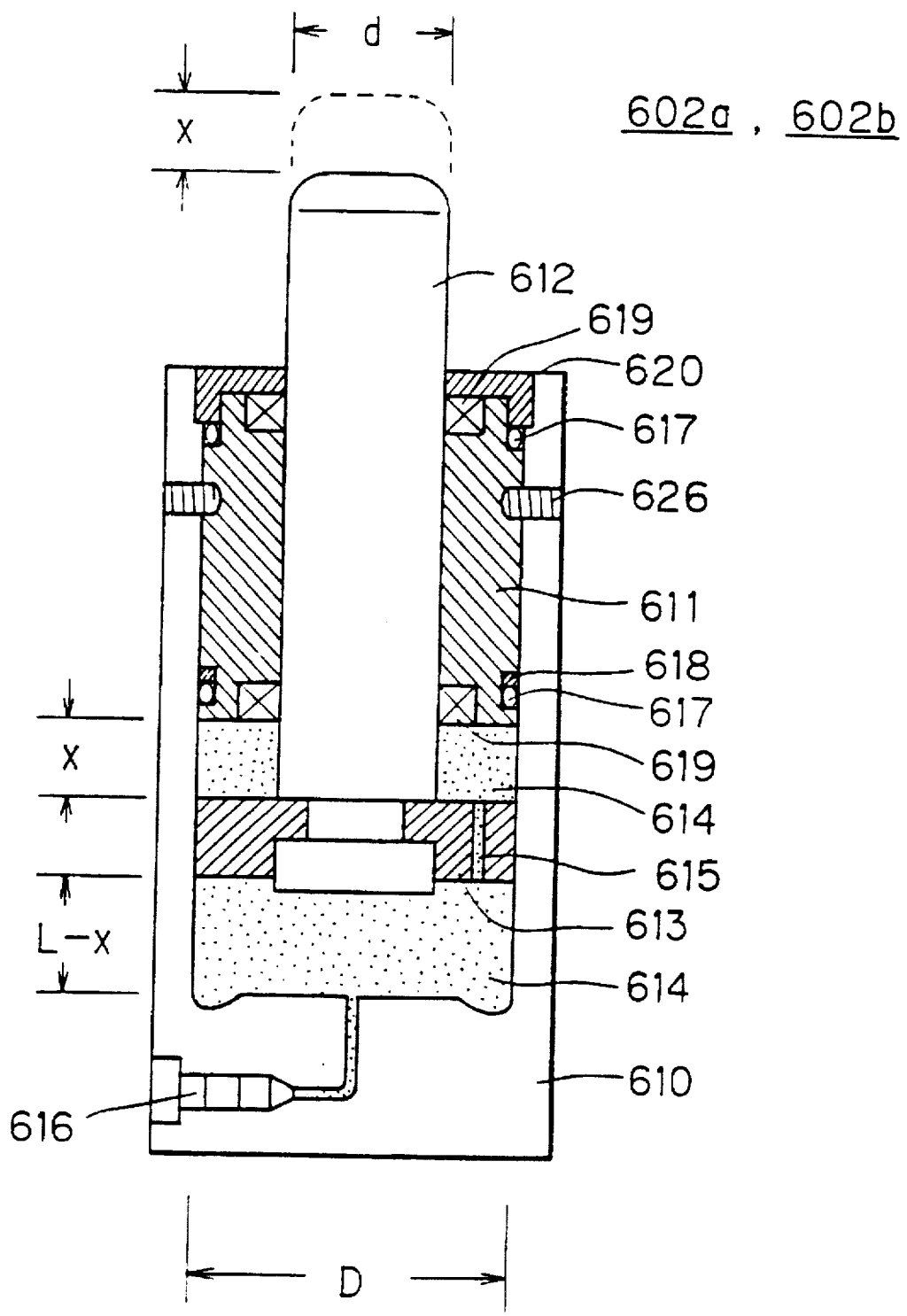
FIG. 6 is a cross-sectional view of a gas spring body of the first preferred embodiment.

FIG. 6 is a cross-sectional view of the gas spring bodies 602a, 602b. A cartridge 611 is provided in fixed contact with the inner surface of a housing 610. A piston rod 612 is slidably fitted in the cartridge 611. A rod retainer 613 fixedly mounted on the bottom of the piston rod 612 slidably contacts the inner surface of the housing 610 to function to guide the sliding of the piston rod 612. A gas chamber 614 kept hermetic off the outside by the housing 610, cartridge 611, and piston rod 612 has a pressure to extrude the piston rod 612 outwardly and is filled with a gas serving as a medium of the gas springs. The filling gas to be used is, for example, gaseous nitrogen which does not harm a person and is present in the air and is easily treated. The gas chamber 614 is a series of spaces communicating with each other through a vent 615 provided in the rod retainer 613. The filling gas is filled into and exhausted from the gas chamber 614 through a valve 616. The valve 616 has a structure of a non-return valve which prevents the filling gas from leaking to the outside therethrough in normal operation.

The cartridge 611 is fixed to the housing 610 by a slip-off stop 626. To keep the hermeticity, an O-ring 617 is provided between the housing 610 and cartridge 611. A backup ring 618 suppresses the O-ring 617 to enhance the hermeticity keeping effect. A seal 619 is fixed to the cartridge 611 to keep the hermeticity between the cartridge 611 and the sliding piston rod 612. A guide 620 is a dustproof member provided on the head of the housing 610.

Operation of Resin-sealing System 100

Figure 7:
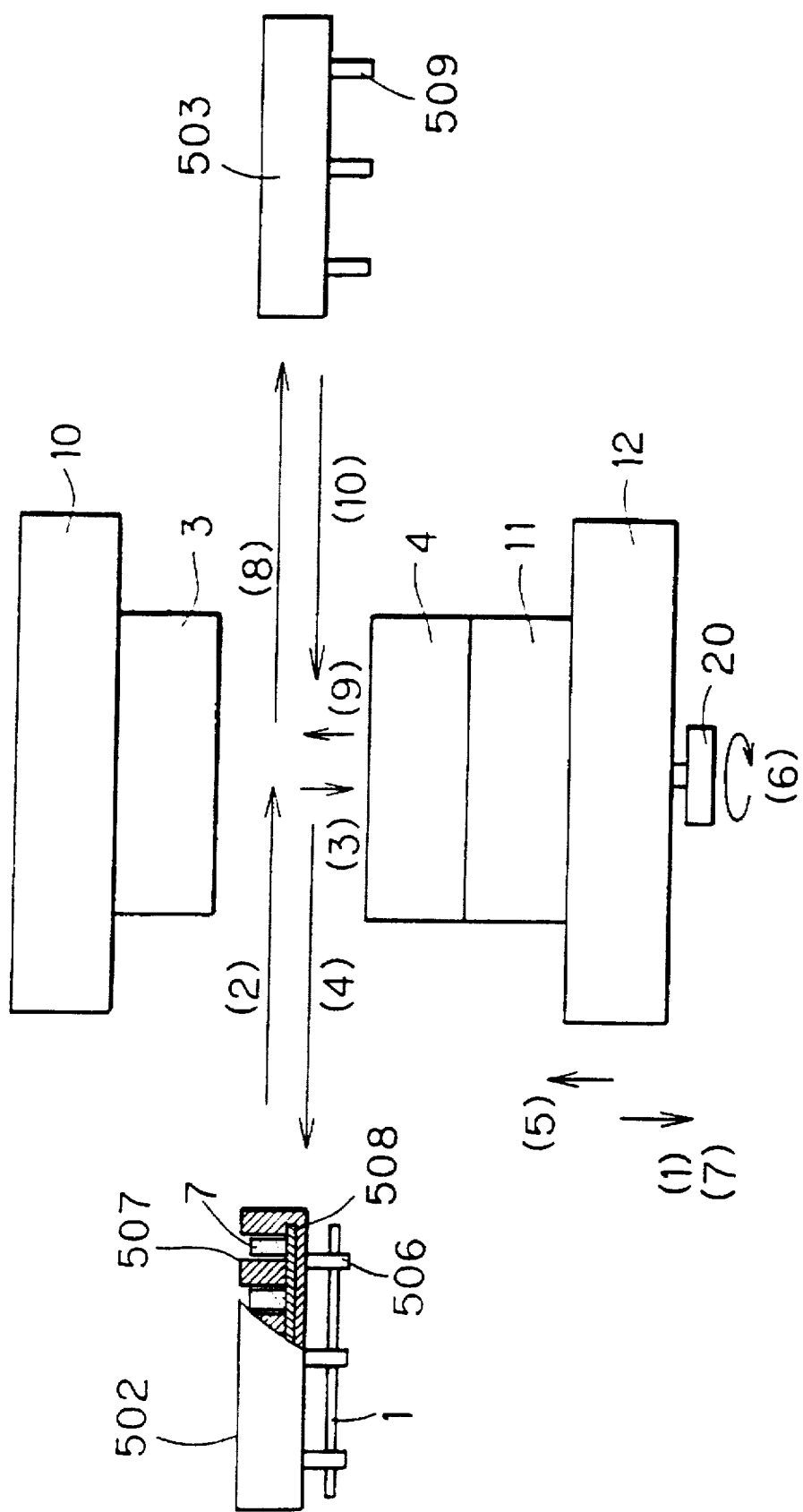
FIG. 7 schematically shows processes of the operation of the resin-sealing system of the first preferred embodiment.

FIG. 7 schematically illustrates process steps of the operation of the resin-sealing system 100. The arrows of FIG. 7 represent the travelling direction of the members in the respective steps and numerals in parentheses appended to the arrows represent the order of the steps. In the step 1, the mobile platen 12 descends to open the upper and lower metal molds 3, 4. The loader 502 holding the leadframe I on which the semiconductor element 2 is placed and the tablet 7 moves to a position immediately above the lower metal mold 4 in the step 2. The leadframe 1 is gripped by claws 506 attached to the loader 502. The tablet 7 is inserted in a holding aperture 507 provided in the loader 502 and are supported by a shutter 508 closed. In the step 3, the leadframe 1 and tablet 7 depart from the loader 502 to be placed in position on the lower metal mold 4. The leadframe 1 drops by inclining the claws 506, and the tablet 7 drops by opening the shutter 508. The loader 502 returns to the original standby position in the step 4. The mobile platen 12 ascends so that the upper and lower metal molds 3, 4 are locked at a predetermined pressure in the step 5.

The sealing operation is performed by means of the resin-sealing apparatus 200 in the step 6 which will be described in detail later. The mobile platen 12 descends again to open the upper and lower metal molds 3, 4 in the step 7. The unloader 503 moves to a position immediately above he lower metal mold 4 in the step 8. The leadframe 1 is gripped by claws 509 attached to the unloader 503 in the step 9. This permits the leadframe 1 with the sealed semiconductor element 2 to be removed from the lower metal mold 4. At the same time, the unloader 503 removes residual resin in the lower metal mold 4. The unloader 503 returns to the standby position in the step 10.

Operation of Resin-sealing Apparatus 200

Referring again to FIG. 1, description will be given on the operation of the resin-sealing apparatus 200. Prior to the step 3 for feeding the materials to be sealed and the tablet 7, the metal mold temperature controller 420 function to heat and keep the upper and lower metal molds 3, 4 at temperatures suitable for hardening of thermosetting resin, for example about 180° C. After the mobile platen 12 ascends and the upper and lower metal molds 3, 4 are locked and pressurized in the step 5, the motor 22 is driven so that molten resin of the tablet 7 is pressurized through the buffer mechanism 600. The molten resin is extruded from the pot 8 so that the leadframe 1 and the semiconductor element 2 are sealed with the molten resin of a configuration defined by the cavity 5.

In the course of the injection of the molten resin into the cavity 5, the compressive force equivalent to the reactive force of the resin injection pressure acts on the plunger rod 15b gradually increasingly, so that the piston rod 612 of the gas spring body 602a is accordingly pressed down. The contact of the upper surface of the rod retainer 613 with the bottom surface of the cartridge 611 prevents the piston rod 612 from projecting out over a certain limit. Thus the compression displacement is caused in the gas spring body 602a by applying a compressive force exceeding a certain level (an initial compressive force) corresponding to the pressure of the filling gas.

As shown in FIG. 6, the compressive force acting on the piston rod 612 when the gas spring body 602a is pressed a displacement x down, that is, a restoring force Fx of the gas spring body 602a is:

$$p \cdot V = (\text{constant}), A \cdot p = \frac{\pi \cdot D^2}{4} \cdot p = F0, Fx = \frac{L}{L - (A/0) \cdot x} \cdot F0 \quad (2)$$

where p is a pressure (kgf/cm$^2$), V is the volume of the gas chamber (cm$^2$), A is the cross-sectional area of the piston rod (cm$^2$), D is the diameter of the piston rod (cm), and F0 is an initial compressive force (kgf).

Figure 8:
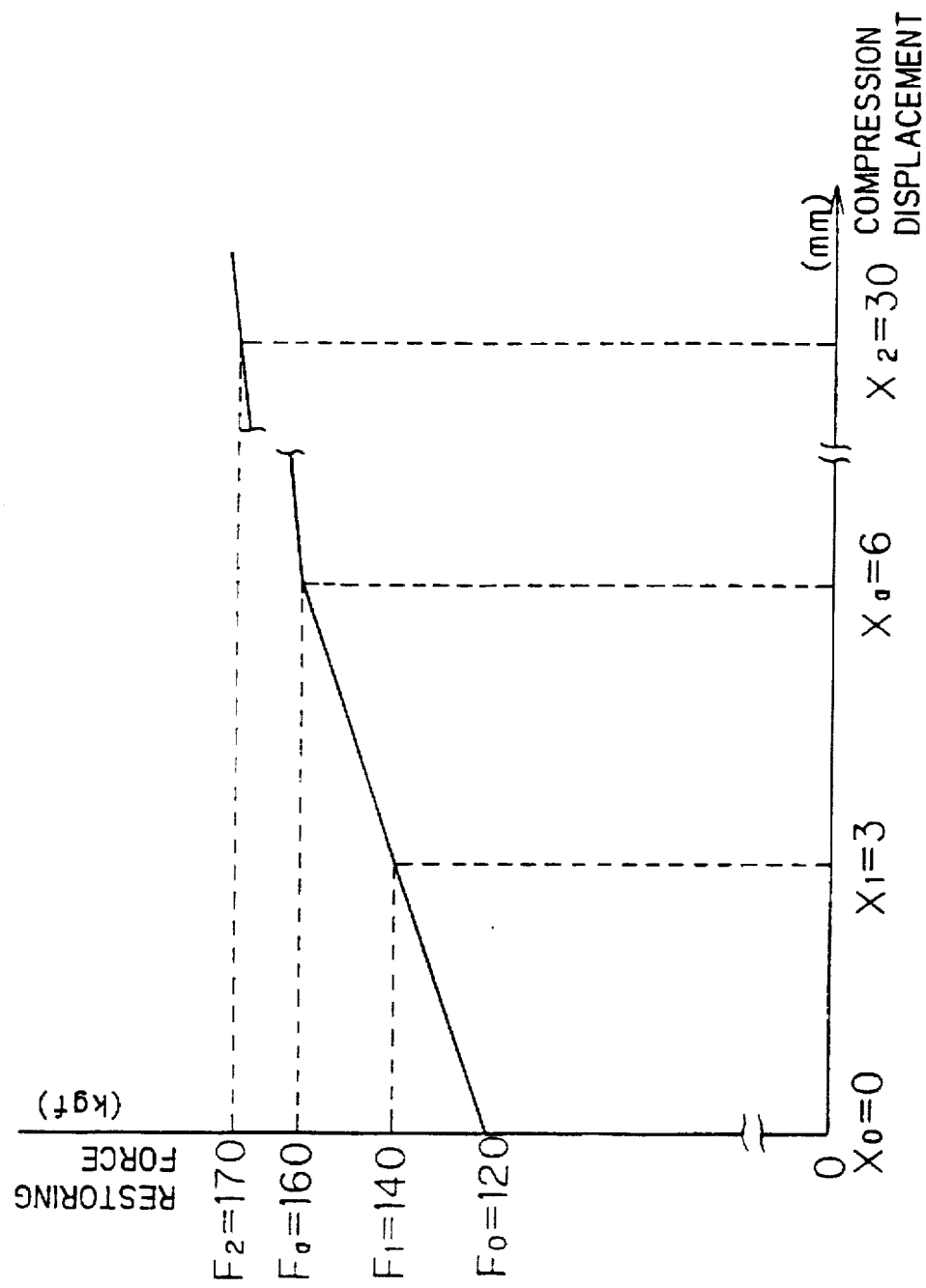
FIG. 8 is a graph showing relation between compression displacement and restoring force of a gas spring of the first preferred embodiment.

As the compressive force increases, the piston rod 612 is further pressed down until the bottom surface of the plunger rod 15b contacts the holder 602c. Then the gas spring body 602a is no longer compressed, and the piston rod 612 of the gas spring body 602b is instead pressed down. Relation between the compression displacement of the gas spring 602 and the accompanying restoring force is shown, for example, in the graph of FIG. 8. In this example, the cross-sectional area A of the pot 8 is 2 cm$^2$, the injection pressure p is set to 70 kgf/cm$^2$ (i.e., the injection force F1 is set to 140 kgf), and the initial compressive force F0 is set to 120 kgf which is equivalent to 60 kgf/cm$^2$ if estimated in pressure. As the compression displacement increases from zero, the restoring force slowly increases from the initial compressive force of 120 kgf. In this section, only the gas spring body 602a causes the compression displacement, and the gas spring body 602b is not displaced. Control of the configuration of the gas spring body 602a and the pressure of the filling gas provides such slow increase characteristics of the restoring force without difficulty. Thus variations in the amount of resin of the tablets 7 and in length of plungers 15 are absorbed in a wider range than the prior art, or errors of the injection force with respect to the predetermined variations are made smaller than the prior art. As a result, differences in the injection pressures of the respective pots are reduced, achieving the injection at approximately equal pressures. The use of the gas spring body 602a having the characteristics illustrated in FIG. 8 enables the errors of the injection force to fall in the range of about ±7 kgf if the variations such as the length of the plungers 15 is within ±1 mm.

When the restoring force reaches a level Fa, the gas spring body 602b in place of the gas spring body 602a causes the compression displacement. The restoring force accordingly increases more slowly as the compression displacement increases. For example, the restoring force remains 170 kgf when the compression displacement reaches 30 mm. Such characteristics may be easily achieved by suitably making the ratio of the cross-sectional area A of the piston rod 612 to the volume of the gas chamber 614 for the gas spring body 602a higher than the ratio for the gas spring body 602b and suitably making the pressure of the filling gas for the gas spring body 602b higher than that for the gas spring body 602a.

The increase of the restoring force with increase in compression displacement grows more slowly when the restoring force exceeds the level Fa. If the compression displacement of the gas spring 602 grows extremely large in abnormal injection operation wherein the aperture of the gate 6 is clogged up due to some cause or wherein two tablets 7 are put into one pot 8 simultaneously, the injection is attained with reduced injection pressure errors at uniform pressures and the apparatus is prevented from being damaged by an excessive compressive force.

The injection pressures are easily changed by changing the pressure of the filling gas in the gas spring bodies 602a, 602b. The gas spring bodies 602a, 602b do not change the characteristics upon the excessive compressive force, causing neither the deterioration of the injection pressures in the course of the operation nor increasing errors of the injection pressures. In the gas spring bodies 602a, 602b, the piston rod 612 does not project out to the outside over a predetermined stroke (the compression displacement x=0) without the application of the external compressive force. Advantageously the gas spring is thus mounted in or dismounted from the buffer mechanism 600 with ease.

Change and control of the pressure of the filling gas in the gas spring bodies 602a, 602b are made by changing and controlling the temperature of the filling gas by the control of the heater 604 in the gas temperature controller 41, for example, as a function of Table 1.

TABLE 1

Relation between temperature and pressure of gaseous nitrogen (100 bar at 25° C.)

| temperature (°C.) | pressure (bar) |
|---|---|
| 25 | 100.0 |
| 40 | 105.4 |
| 60 | 112.6 |
| 80 | 119.8 |
| 100 | 127.0 |
| 120 | 134.2 |
| 160 | 148.6 |
| 180 | 155.8 |
| 200 | 163.0 |

Second Preferred Embodiment

Figure 9:
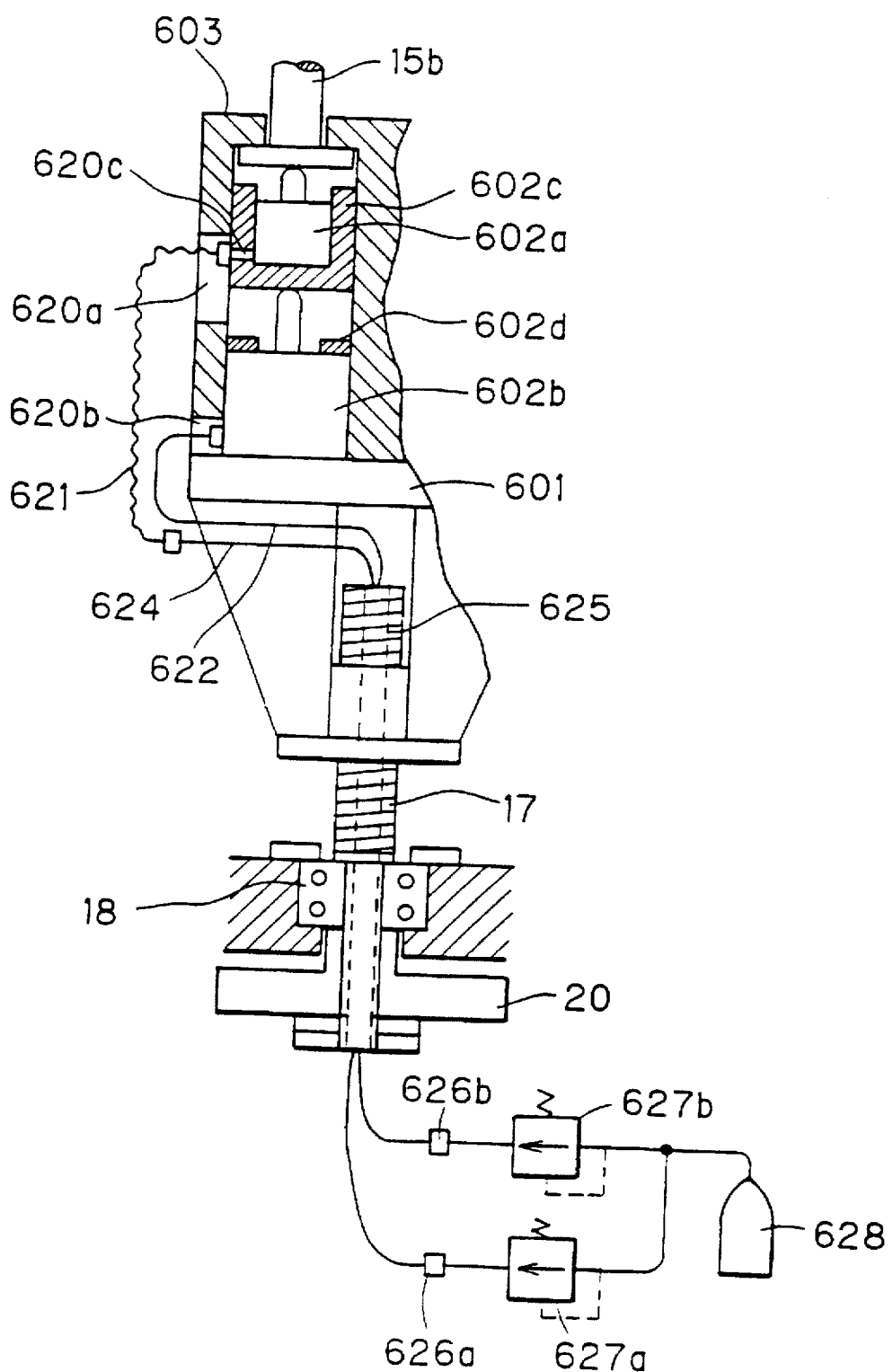
FIG. 9 is a cross-sectional view of the gas spring and its vicinity according to a second preferred embodiment of the present invention.

FIG. 9 is a cross-sectional view of the gas spring 602 and its vicinity according to a second preferred embodiment of the present invention. In the second preferred embodiment, the control of the filling gas pressure of the gas spring 602 is not achieved by the temperature control but by the direct control of the gas pressure. For this purpose, the gas spring case 603 is provided with apertures 620a, 620b in the side wall thereof. A movable high-pressure pipe 621 through the aperture 620a for feeding the filling gas is connected to the valve 616 of the gas spring body 602a, and a high-pressure pipe 622 through the aperture 620b is connected to the valve 616 of the gas spring body 602b. The holder 602c is provided with an aperture 620c for connecting the valve 616 of the gas spring body 602a to the movable high-pressure pipe 621. For adaptation for the vertical sliding of the gas spring body 602a, the movable high-pressure pipe 621 is used as a pipe connected to the gas spring body 602a, and the aperture 620a is elongated at least vertically. The movable high-pressure pipe 621 is connected to another high-pressure pipe 624. The high-pressure pipes 622, 624 through a through hole 625 provided in the ball screw shaft 17 is connected to regulators 627a, 627b for regulating the gas pressures through joints 626a, 626b, respectively. A cylinder 628 for feeding a high-pressure gas, for example, is connected to the regulators 627a, 627b.

The high-pressure gas fed by the cylinder 628, after being subjected to pressure regulation in the regulators 627a, 627b, is supplied to the gas spring bodies 602a, 602b by way of the various pipes. The pressure of the filling .gas in the gas spring bodies 602a, 602b may be easily changed or controlled by manipulating the regulators 627a, 627b.

Third Preferred Embodiment

Figure 10:
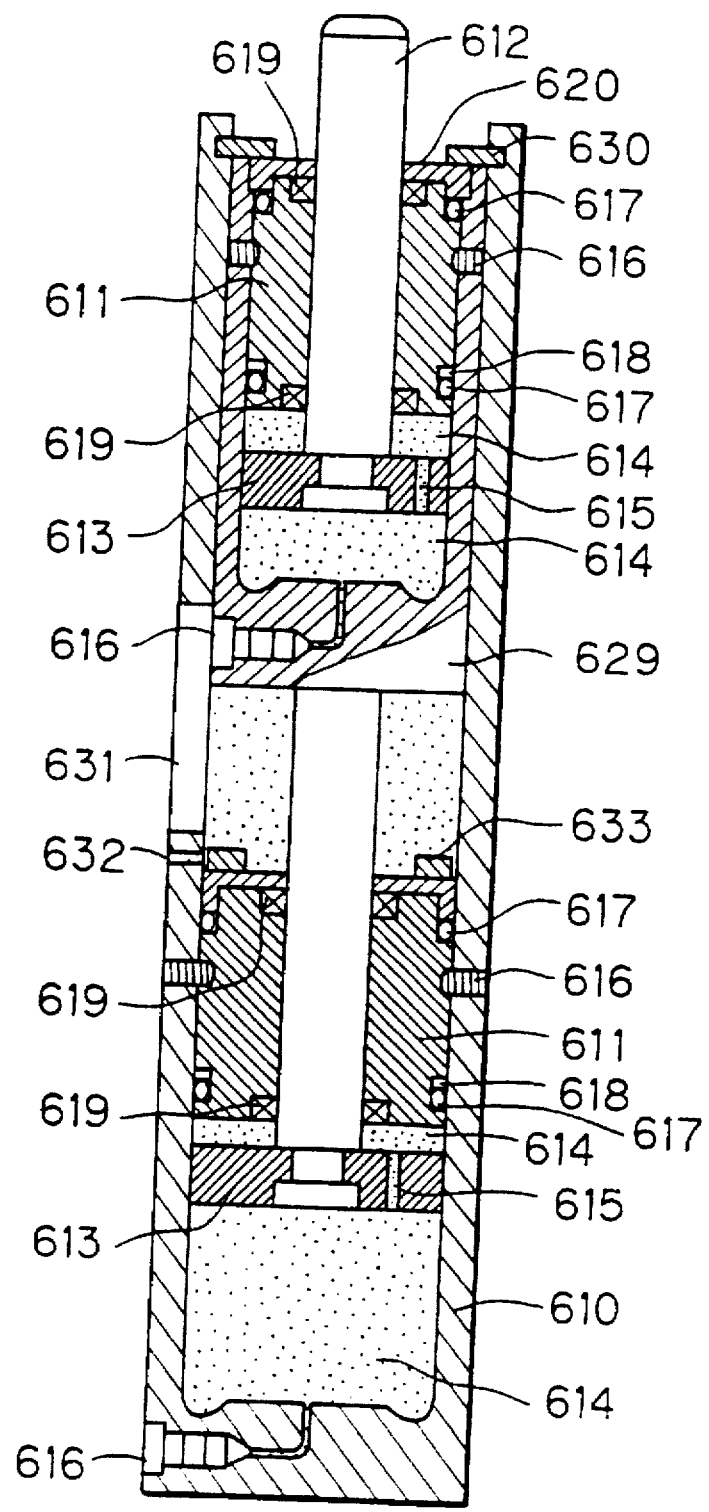
FIG. 10 is a cross-sectional view of the gas spring according to a third preferred embodiment of the present invention.

FIG. 10 is a partial cross-sectional view of the gas spring 602 according to a third preferred embodiment of the present invention. The gas spring 602 includes the integral two-stage cascade connected gas spring bodies 602a, 602b. A lower piston rod 629 also serving as an upper housing slides in contact with the inner surface of the housing 610 and fixes the upper cartridge 611. A snap ring 630 prevents the piston rod 629 from projecting out from the head of the housing 610. The upper piston rod 612 is slidably fitted in the upper cartridge 611. The housing 610 is provided with an aperture 631 for injection and exhaust of the filling gas through the upper valve 616. An air vent 632 is provided in the side wall of the housing 610 so that the air or the like which is present in the space between the piston rod 629 and the lower cartridge 611 does not prevent the sliding of the piston rod 629. A collar 633 provides the lower limit of the sliding range of the piston rod 629.

The snap ring 630 prohibits the piston rod 629 from projecting out to the outside beyond an opening of the housing 610. The contact of the upper surface of the upper rod retainer 613 with the bottom surface of the cartridge 611 prevents the piston rod 612 from projecting out over a certain limit. In the same fashion as the gas spring bodies 602a, 602b of the first preferred embodiment, it is necessary to apply the compressive force exceeding a certain level in accordance with the pressure of the filling gas for compression displacement in the gas spring 602. The initial compressive force of a predetermined level may be established in the gas spring of the third preferred embodiment.

As the compressive force increases over the initial compressive force, the piston rod 612 descends until the bottom surface of the piston rod 612 contacts the piston rod 629 (the restoring force=Fa at this time). Subsequently the piston rods 629 and 612 descend integrally. The gas spring of the third preferred embodiment provides the characteristics shown in FIG. 8.

Fourth Preferred Embodiment

Figure 11:
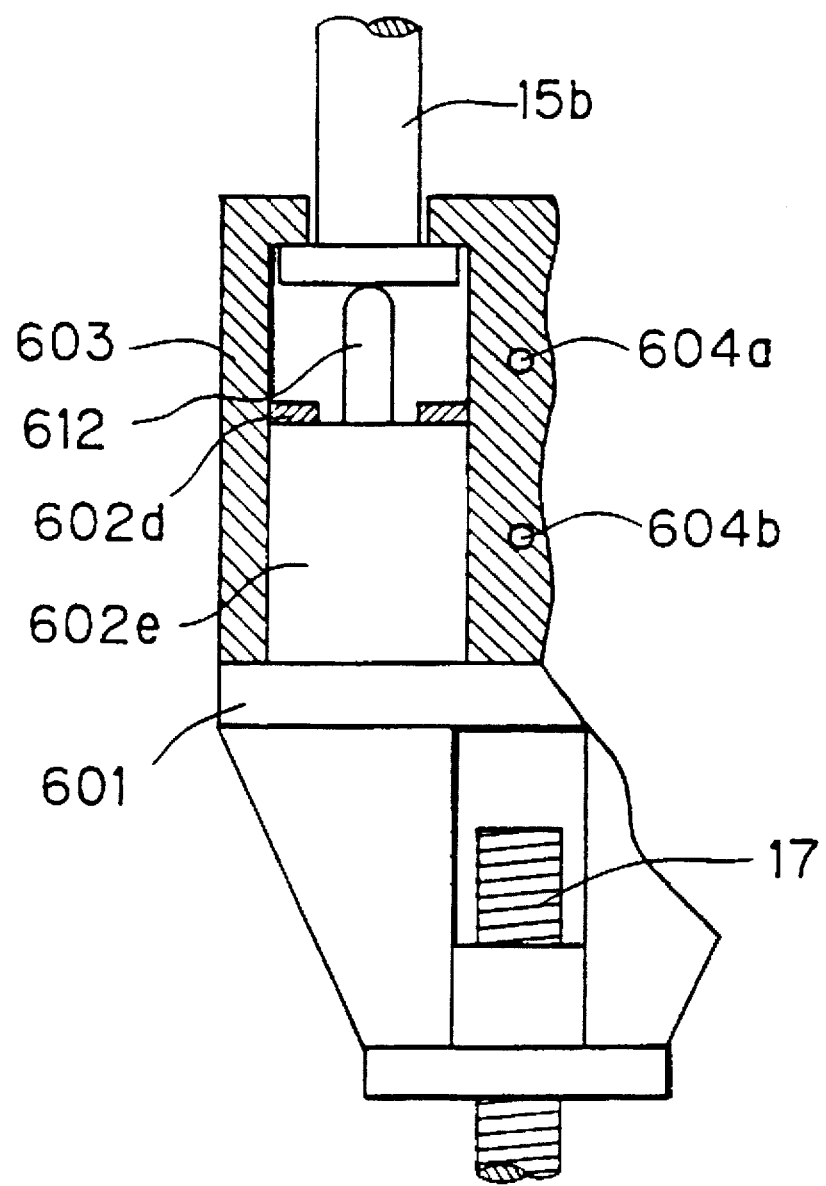
FIG. 11 is a cross-sectional view of the gas spring and its vicinity according to a fourth preferred embodiment of the present invention.
Figure 12:
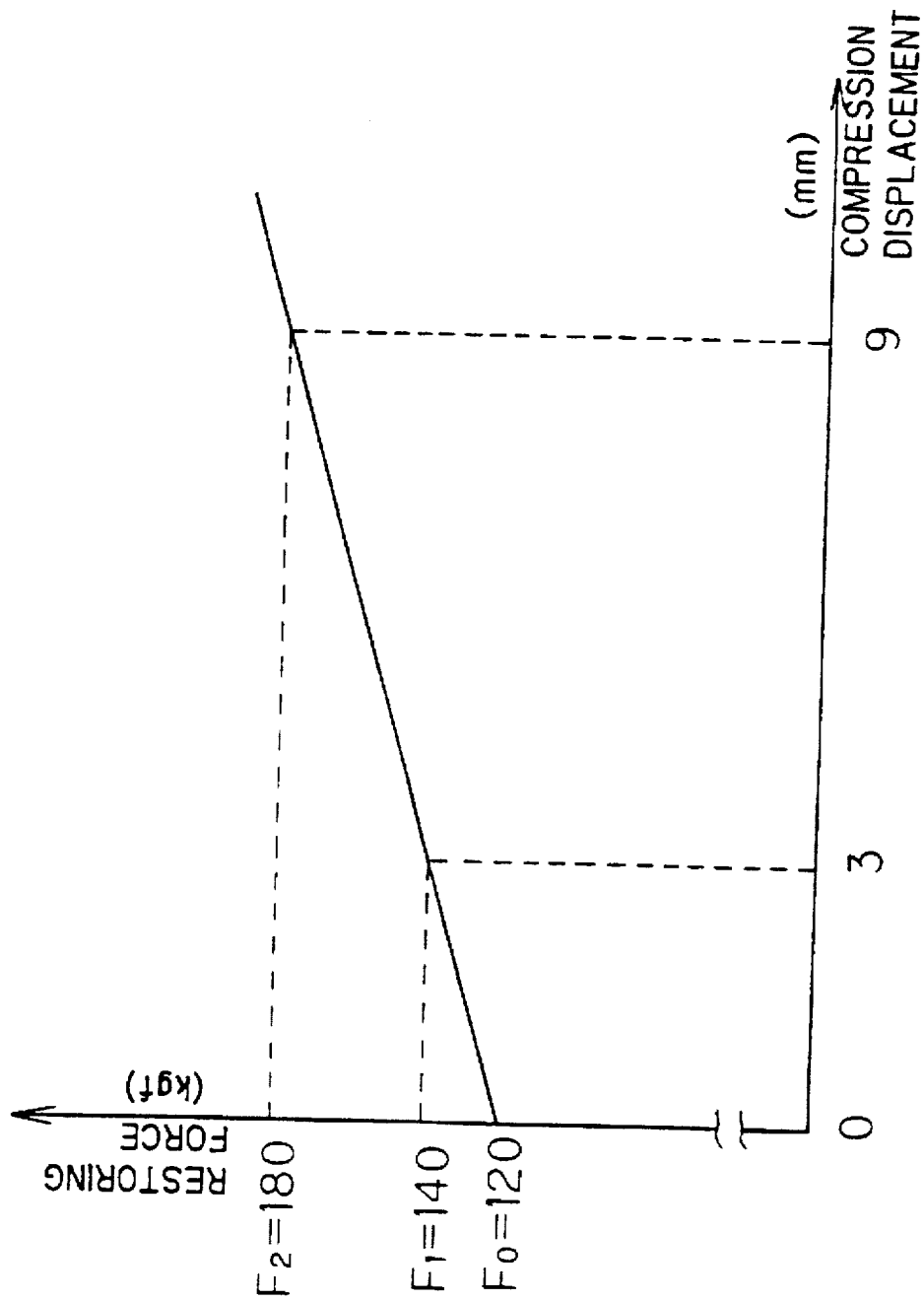
FIG. 12 is a graph showing relation between compression displacement and restoring force of the gas spring of the fourth preferred embodiment.

FIG. 11 is a schematic partial cross-sectional view of the gas spring 602 according to a fourth preferred embodiment of the present invention. In the fourth preferred embodiment, a single gas spring body 602e forms the gas spring 602. The characteristics of the gas spring 602 are shown in the graph of FIG. 12. The characteristic curve of FIG. 12 has no folded portion of the restoring force Fa shown in FIG. 8, and the restoring force of FIG. 12 increases at a constant gradient as the compression displacement increases. This provides less error reduction effect upon an extremely large compression displacement in abnormal injection operation. However, the increase of the restoring force with the subsequent increase of the compression displacement may be set slowly in the same fashion as that of FIG. 8. Thus the variations in the amount of resin of the tablets 7 and in length of the plungers 15 are absorbed in a wider range than the prior art, or the errors of the injection force with respect to the predetermined variations are made smaller than the prior art. The apparatus of the fourth preferred embodiment facilitates the structure and handling thereof.

Fifth Preferred Embodiment

Figure 13:
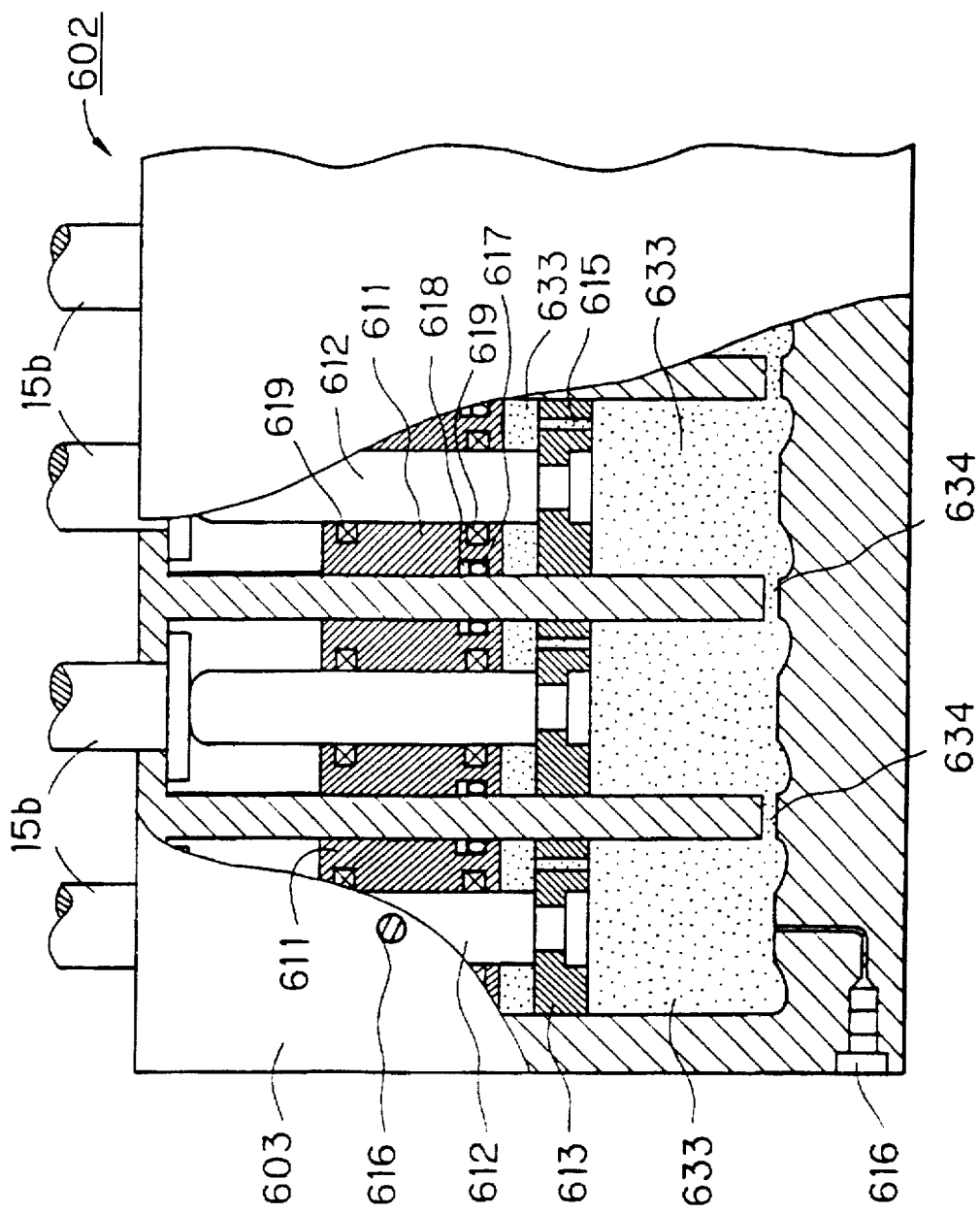
FIG. 13 is a partial cross-sectional view of the gas spring according to a fifth preferred embodiment of the present invention.

FIG. 13 is a partial cross-sectional view of the gas spring 602 according to a fifth preferred embodiment of the present invention. The single gas spring 602 is provided with respect to a plurality of plunger rods 15b. The gas chambers 633 in which the respective piston rods 612 are housed are adapted to communicate with each other by apertures 634. This affords equal pressures of the filling gas acting on the respective piston rods 612, whereby uniform compressive forces act on the respective plunger rods 15b.

Since the gas spring case 603 also prevents the plunger rods 15b from slipping off, the piston rods 612 are not permitted to project out over a certain limit. The initial compressive force may be set in the gas spring 602 of the fifth preferred embodiment.

Sixth Preferred Embodiment

Figure 14:
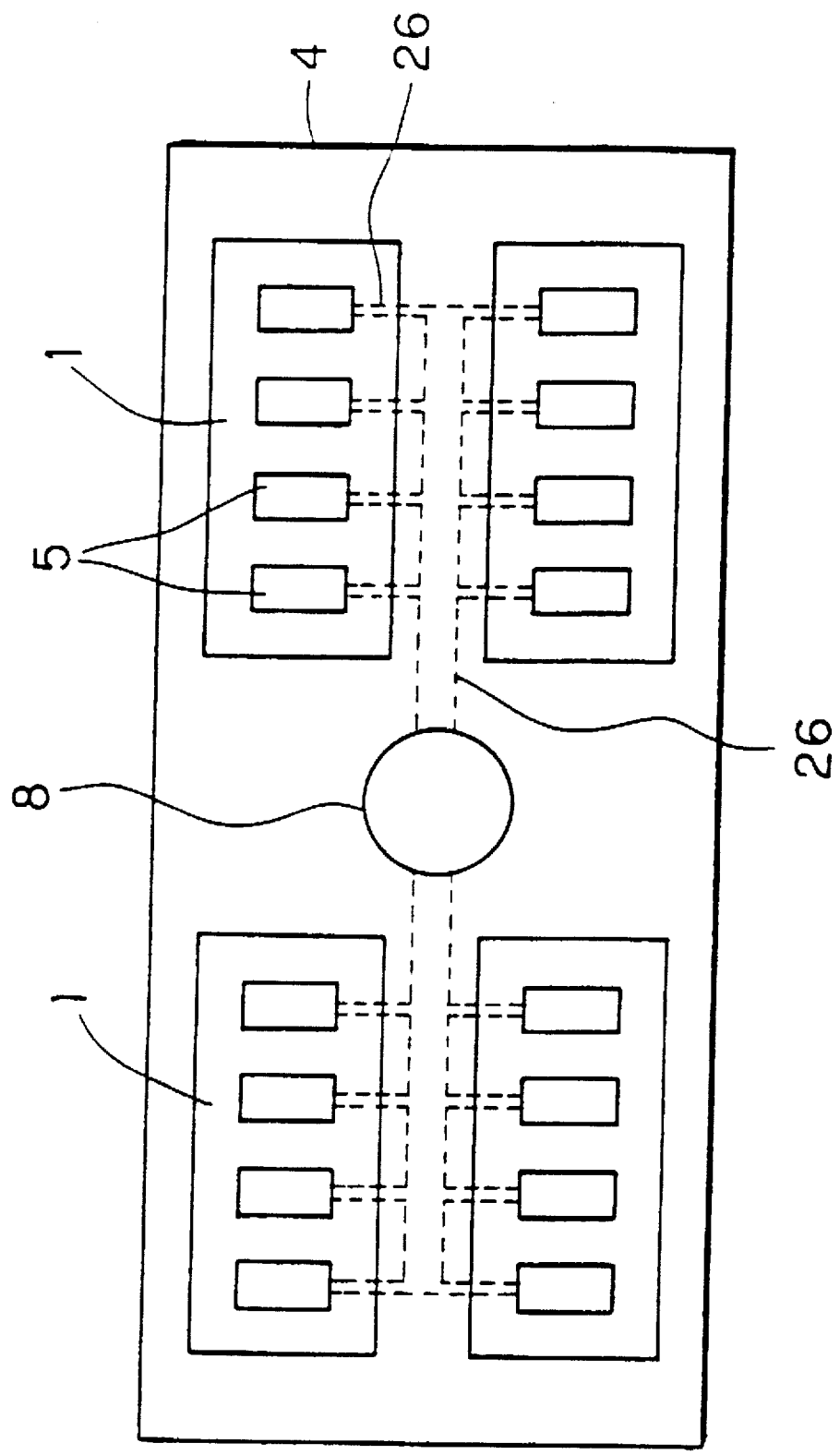
FIG. 14 is a schematic plan view of a lower metal mold of the resin-sealing apparatus according to a sixth preferred embodiment of the present invention.

FIG. 14 is a schematic plan view of the lower metal mold 4 of the resin-sealing apparatus 200 according to a sixth preferred embodiment of the present invention. One pot 8 is provided for the plurality of cavities 5 in the sixth preferred embodiment. The molten resin is transmitted from the pots 8 through the flow path 26 to the respective cavities 5 under pressure. The flow path 26 shown in the dotted lines of FIG. 14 is provided in the upper metal mold 3.

Seventh Preferred Embodiment

Figure 15:
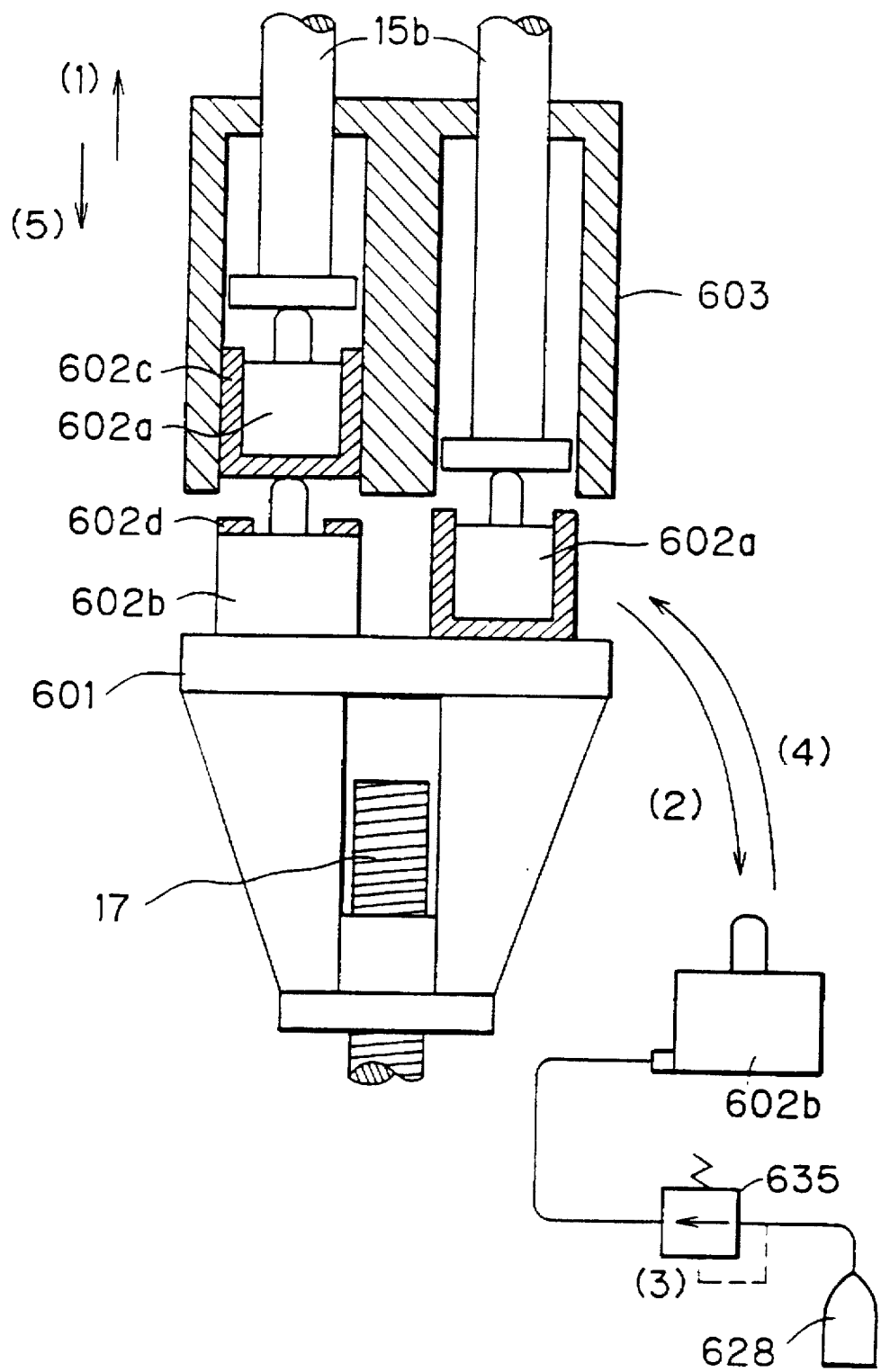
FIG. 15 shows processes of a method of regulating a filling gas pressure according to a seventh preferred embodiment of the present invention.

FIG. 15 shows process steps of a method of regulating the pressure of the filling gas in the gas spring bodies 602a, 602b according to a seventh preferred embodiment of the present invention. The numerals in parentheses represent the order of the process steps. In the seventh preferred embodiment, the buffer mechanism 600 is initially disassembled (the step 1). The gas spring bodies 602a, 602b are taken out (the step 2), and the pressure of the filling gas is regulated by means of a regulator 635 (the step 3). The gas spring bodies 602a, 602b are thereafter returned to the buffer mechanism 600 (the step 4), and the buffer mechanism 600 is assembled (the step 5). The seventh preferred embodiment is advantageous in simple structures of the buffer mechanism 600 and gas spring 602 although requiring more labor than the first to sixth preferred embodiments for regulation of the filling gas pressure.

Other Preferred Embodiments (1) The first to seventh preferred embodiments are applicable not only to the sealing with the thermosetting resin but also to the molding of connector bodies with thermoplastic resin, for example.

(2) The gaseous nitrogen may be replaced with other gases as the filling gas of the gas spring 602.

While the invention has been shown and described in detail, the foregoing description is in all aspects illustrative and not restrictive. It is therefore understood that numerous modifications and variations can be devised without departing from the scope of the invention.

What is claimed is:

1. A gas spring using a gas as a buffer medium, comprising:
    (a) a housing defining a plurality of cylinders respectively having first ends and second ends, said cylinders being arranged in parallel;
    (b) a plurality of pistons slidably fitted in said plurality of cylinders respectively for defining spaces therewith and with said cylinders including said second ends which are hermetically sealed relative to an outside of said housing and communicate with each other;
    (c) means for limiting a sliding range of each of said plurality of pistons to prevent each of said pistons from projecting out over a predetermined degree from said housing,
    wherein said means for limiting a sliding range of said pistons comprises an end wall of said housing at said first ends of said cylinders, and
    (d) cartridges airtightly fixed in said cylinders respectively,
    wherein each of said pistons is provided with a piston rod and a rod retainer, said piston rods each slidably and airtightly penetrating a corresponding one of said cartridges,
    wherein each retainer is fixedly mounted on a bottom of a corresponding piston rod and slidably contacts an inner surface of a corresponding one of said cylinders,
    wherein each retainer defining a corresponding vent, and
    wherein each of said spaces is defined with a corresponding retainer, a corresponding piston rod, a corresponding cylinder inner surface, and a corresponding one of said second ends.

2. The gas spring according to claim 1, wherein:
    the filling gas comprises nitrogen.

3. The gas spring according to claim 1, further comprising:
    means for providing said filling gas under pressure.

4. The gas spring according to claim 3, wherein:
    the filling gas comprises nitrogen.

5. The gas spring according to claim 4, wherein:
    said means for limiting a sliding range of said pistons comprises an end wall of said housing at said first ends of said cylinders.

6. The gas spring according to claim 1, further comprising:
    a valve mounted in said housing between said spaces in said cylinders and the outside, said valve permitting said gas to pass into the housing and having a non-return function to prevent outflow of the gas from said spaces to the outside.

7. The gas spring according to claim 1, wherein:
    said spaces communicate with each other through apertures which are defined by said housing.

* * * * *